United States Patent [19]
Aoyama et al.

[11] Patent Number: 5,498,670
[45] Date of Patent: Mar. 12, 1996

[54] COATING COMPOSITIONS CONTAINING CROSSLINKED SPHERICAL FINE PARTICLES

[75] Inventors: Takahiro Aoyama, Osaka; Mitsuo Nakazaki, Takatsuki; Akikazu Banba, Ibaraki; Masatoshi Yoshida, Osaka; Toshiaki Matsunaga, Suita; Tsuneo Tsubakimoto, Toyonaka, all of Japan

[73] Assignee: Nippon Shokubai Kagaku Kogyo Co., Ltd., Osaka, Japan

[21] Appl. No.: 325,105

[22] Filed: Oct. 17, 1994

Related U.S. Application Data

[62] Division of Ser. No. 94,450, Jul. 21, 1993, abandoned, which is a division of Ser. No. 866,305, Apr. 13, 1992, abandoned, which is a continuation of Ser. No. 613,682, filed as PCT/JP90/00381, Mar. 20, 1990, abandoned.

[30] Foreign Application Priority Data

Mar. 23, 1989 [JP] Japan ..................................... 1-69339
Jun. 1, 1989 [JP] Japan ................................... 1-137477
Jun. 1, 1989 [JP] Japan ................................... 1-137478

[51] Int. Cl.$^6$ .......................... C08L 39/00; C08L 33/06; C08L 29/02
[52] U.S. Cl. .......................... 525/217; 525/231; 525/227
[58] Field of Search ........................... 526/301; 525/217, 525/227, 231

[56] References Cited

U.S. PATENT DOCUMENTS 4,801,640  1/1989  Dallmann et al. ................. 524/394
4,833,177  5/1989  Faler et al. ......................... 523/221

FOREIGN PATENT DOCUMENTS 59-74116  4/1984  Japan.

Primary Examiner—Joseph L. Schofer
Assistant Examiner—Wu C. Cheng
Attorney, Agent, or Firm—Oblon, Spivak, McClelland, Maier & Neustadt

[57] ABSTRACT

Disclosed herein are crosslinked spherical fine particles having good toughness, elastic properties, and chemical properties, and a process for producing the same, said fine particles being obtained by radical polymerization in the suspended state of a component [M] capable of radical polymerization containing a vinyl group-containing compound (V) capable of radical polymerization which is obtained by reaction of (a) a selected polyol, (b) an isocyanate group-containing compound, and (c) an active hydrogen-containing vinyl monomer capable of radical polymerization. Also disclosed herein are the secondary products of the crosslinked spherical fine particles, which include a coating composition and its derivatives (such as filmlike article, sheetlike article, adhesive filmlike article, and adhesive sheetlike article) and a peelable pressure-sensitive adhesive and peelable pressure-sensitive adhesive article.

30 Claims, No Drawings

1

COATING COMPOSITIONS CONTAINING CROSSLINKED SPHERICAL FINE PARTICLES

This application is a divisional of application Ser. No. 08/094,450, filed Jul. 21, 1993, now abandoned, which is a divisional of Ser. No. 07/866,305, filed Apr. 13, 1992, now abandoned, which is a continuation of Ser. No. 07/613,682, filed Nov. 20, 1990, now abandoned, which was filed as International Application No. PCT/JP90/00381 on Mar. 20, 1990.

FIELD OF TECHNOLOGY

The present invention relates to crosslinked fine particles and a process for producing the same, said crosslinked fine particles having outstanding mechanical characteristics such as toughness and elastic properties (especially, very little susceptibility to damages by external forces and good recovery from deformation) and also having good resistance to chemicals (acids and alkalis) and organic solvents and weathering. The crosslinked spherical fine particles are useful as follows; a filler, delustering agent, and reinforcing agent for paints, plastics, rubber and so on; a spacer for liquid-crystal display units; a carrier of toner for electrostatic duplicators; and a filler for cosmetics and toothpaste. The present invention also provides new articles based on the characteristics of said crosslinked spherical fine particles, said articles including a coating composition which gives rise to a coating film having a unique appearance and feel, a product in the form of film, sheet, or adhesive film made from said coating composition, and a peelable pressure-sensitive adhesive (and a product thereof) containing said crosslinked spherical fine particles.

BACKGROUND OF TECHNOLOGY

There have been known a variety of spherical fine particles, both inorganic and organic, and they are in use for a broad range of applications. Inorganic spherical fine particles are generally hard but have no elasiticity, what's more, they have a disadvantage of being poor in resistance to chemicals (such as acids and alkalis) and organic solvents. There have been known organic spherical fine particles which are made of epoxy resin, acrylic resin, polyester-polyether urethane resin (*), nylon resin, polyethylene resin, polypropylene resin, phenolic resin, or amino resin. These organic spherical fine particles, unless crosslinked, are poor in toughness, elastic properties, recovery, solvent resistance, heat resistance, and chemical resistance. When crosslinked, they are partly exempt from the above-mentioned disadvantages of inorganic spherical fine particles and uncrosslinked organic spherical fine particles; but they still do not meet all of the requirements for mechanical characteristics (such as toughness and elastic properties) and resistance to chemicals (acids and alkalis) and organic solvents and weathering.
(* See Japanese Patent Publication No. 8116/1975, Japanese Patent Laid-open No. 611/1990, and U.S. Pat. No. 4,783,502.)

The above-mentioned inorganic or organic spherical fine particles are dispersed in the resin for binder and are used as a component of a coating composition which gives rise to a coating film having a leatherlike or velvetlike finish. There have been proposed many kinds of such coating compositions. Unfortunately, the performance of coating compositions are not improved enough because of the above-mentioned disadvantages involved in inorganic and organic spherical fine particles. Therefore, they give rise to a filmy product (formed by molding into film) and a sheet product (formed by application to a substrate) which do not have the desired performance. In addition, the abovementioned spherical fine particles are used as a component of a peelable pressure-sensitive adhesive. In this case, too, the peelable pressure-sensitive adhesive is not good enough in adhesion, peelability, durability, and weathering because of the above-mentioned disadvantages involved in spherical fine particles.

The present invention was completed in view of the foregoing. Accordingly, it is an object of the present invention to provide crosslinked spherical fine particles having outstanding mechanical characteristics (such as toughness and elastic properties) and good resistance to chemicals (acids and alkalis) and organic solvents and weathering. The crosslinked spherical fine particles are useful as follows; a filler, delustering agent, and reinforcing agent for paints, plastics, rubber and so on; a spacer for liquid-crystal display units; a carrier or toner for electrostatic duplicators; and a filler for cosmetics and toothpaste.

It is another object of the present invention to provide a process for producing crosslinked spherical fine particles having the above-mentioned characteristic properties.

It is further another object of the present invention to provide a coating composition containing said crosslinked spherical fine particles and articles based on said coating composition. The coating composition gives rise to a leatherlike or velvetlike coating film having a excellent appearance and feel owing to the characteristics of the crosslinked spherical fine particles. The articles include a filmy product which is formed by molding the coating composition into film, a sheet product which is formed by application of the coating composition onto one side or both sides of a substrate, and an adhesive film or sheet which is formed by providing one side of said filmy product or sheet product with an adhesive layer.

It is still further another object of the present invention to provide a peelable pressure-sensitive adhesive formed by incorporating a pressure-sensitive adhesive with said crosslinked spherical fine particles as a component to improve peelability, and also to provide a peelable pressure-sensitive adhesive article formed by applying said peelable pressure-sensitive adhesive onto one side of a sheetlike substrate.

Other and further objects, features and advantages of the invention will appear more fully from the following description.

DETAILED DESCRIPTION OF THE INVENTION

According to the present invention, the crosslinked spherical fine particles are formed by polymerizing in the dispersed state a component [M] capable of radical polymerization in a solvent [S] which does not substantially dissolve said component [M], said component [M] containing as an essential component a vinyl group-containing compound (V) capable of radical polymerization which is obtained by the reaction of:

one or more kinds of polyol (a) containing polyester polyol and/or polyether polyol, one or more kinds of compound (b) containing two or more isocyanate groups in the molecule, and one or more kinds of vinyl monomer (c) capable of radical polymerization having an active hydrogen.

The mentioned above vinyl group-containing compound (V) capable of radical polymerization (simply referred to as vinyl group-containing compound (V) hereinafter) contains as one constituent a polyol (a) containing polyester polyol and/or polyether polyol (simply referred to as polyol (a) hereinafter), which is an essential component to impart strength, elastic properties, and flexibility to the crosslinked spherical fine particles.

Examples of the polyester polyol include straight-chain or branched-chain polyester polyols formed by condensation reaction of a polycarboxylic acid with a polyalcohol, and also include polyester polyols formed by ring-opening condensation of lactone (such as β-lactone and δ-actone). Examples of the polycarboxylic acid include phthalic anhydride, isophthalic acid, terephthalic acid, adipic acid, azelaic acid, sebacic acid, tetrahydrophthalic anhydride, maleic anhydride, and trimellitic acid. Examples of the polyalcohol include ethylene glycol, propylene glycol, 1,3-butylene glycol, 1,4-butylene glycol, 1,6-hexanediol, diethylene glycol, dipropylene glycol, triethylene glycol, hydrogenated hisphenol-A, neopentyl glycol, 1,5-pentanediol, 3-methyl-1,5-pentanediol, 1,9-nonanediol, 2,2-dimethyl-3-hydroxypropyl-2,2-dimethyl-3-hydroxy propionate, glycerin, trimethylolethane, trimethylolpropane, and pentaerythritol. If necessary, the condensation reaction may be performed in the presence of a modifying component such as monocarboxylic acid and monohydric alcohol.

Examples of the polyether polyol include qlycols such as polyoxyethylene glycol having 3 or more repeat units of oxyethylene, polyoxypropylene qlycol, poly(oxypropylene)-poly(oxyethylene) glycol, polyoxybutylene glycol, and polyoxytetramethylene qlycol; triols such as polyoxypropylene triol and poly(oxypropylene)-poly(oxyethylene) triol; and polyols such as those which are obtained by addition of alkylene oxides to pentaerythritol or the like.

The polyol (a) should contain one or more kinds of the above-mentioned polyester polyol and/or polyether polyol; it may also contain one or more kinds of polyalcohols (such as ethylene glycol, propylene qlycol, butylene glycol, 1,6-hexanediol, neopentyl glycol, and 1,5-pentanediol) which are used as a raw material for the production of polyester polyol. The content of such polyalcohols should be less than 50 wt % in the polyol (a) so that they have no adverse effect of the feature of the present invention.

The compound (b) containing two or more isocyanate groups in the molecule (referred to as isocyanate compound (b) hereinafter) is an essential component to introduce urethane linkages into the crosslinked spherical fine particles, thereby to give them good mechanical characteristics (such as toughness and elastic properties) and resistance to chemicals (acids and alkalis) and organic solvents. The isocyanate compound (b) also connects the above-mentioned polyol (a) and the undermentioned vinyl monomer (c) having an active hydrogen capable of radical polymerization through the reaction of isocyanate groups, thereby to introduce unsaturated groups capable of radical polymerization into the vinyl group-containing compound (V).

The isocyanate compound (b) may be any known functional isocyanate compound, whose examples include the following.
Isocyanate compounds such as tolylene diisocyanate, 4,4'-diphenylmethane diisocyanate, hexamethylene diisocyanate, xylylene diisocyanate, m-xylylene diisocyanate, 1,5-naphthalene diisocyanate, hydrogenated diphenylmethane diisocyanate, hydrogenated tolylene diisocyanate, hydrogenated xylylene diisocyanate, and isophorone diisocyanate and so on.
Buret polyisocyanate compounds represented by the formula below, such as "Sumidule N" (made by Sumitomo Bayer Urethane Co., Ltd.).

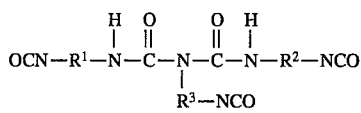

(where $R^1$, $R^2$, and $R^3$ are the same or different divalent organic groups.)
Polyisocyanate compounds having an isocyanurate ring such as "Desmodur IL and HL" (made by Bayer A. G.) and "Colonate EH" (made by Nippon Polyurethane Kogyo Co., Ltd.). Adduct polyisocyanate compounds represented by the formula below, such as "Sumidule L" (made by Sumitomo Bayer Urethane Co., Ltd.) and "Colonate L" (made by Nippon Polyurethane Kogyo Co., Ltd.).

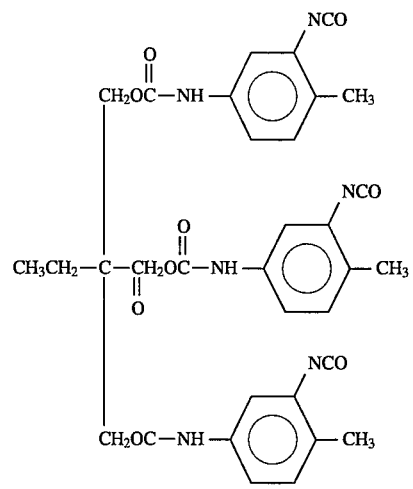

Adduct polyisocyanate compounds represented by the formula below, such as "Colonate HL" (made by Nippon Polyurethane Kogyo Co., Ltd.).

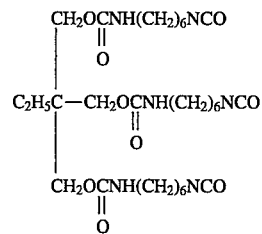

These isocyanate compounds may be used alone or in combination with one another.

The isocyanate compound (b) may contain 2 or more isocyanate groups; however, the one containing 5 or more isocyanate groups is not commercially available. Therefore, the one having 2 to 4 isocyanate groups is desirable from the standpoint of practical use.

To impart a better weathering performance to the crosslinked spherical fine particles of the present invention, it is desirable to use an isocyanate compound having no aromatic rings, such as hexamethylene diisocyanate, hydrogenated diphenylmethane diisocyanate, and "Sumidule N" (made by Sumitomo Bayer Urethane Co., Ltd.).

A monoisocyanate compound having only one isocyanate group in the molecule gives rise to, upon reaction with the polyol (a), a reaction product (intermediate) which does not react with the vinyl monomer (c) having an active hydrogen capable of radical polymerization. However, a monoisocyanate compound may be mixed with the isocyanate compound (b) in an amount which has no adverse effect on the feature of the present invention. Therefore, the isocyanate compound (b) may be used as such without purification even though it contains a monoisocyanate as an impurity. The reaction of the polyol (a) and the isocyanate compound (b) may be accelerated by the aid of any known catalyst such as organotin compound and tertiary amine.

The above-mentioned vinyl monomer (c) having an active hydrogen capable of radical polymerization (simply referred to as monomer (c) hereinafter) is an essential component to introduce an unsaturated group capable of radical polymerization into the vinyl group-containing compound (V). Examples of the monomer (c) are listed below.

(Meth)acrylate esters having a hydroxyl group such as hydroxyethyl (meth)acrylate, hydroxypropyl (meth)acrylate, hydroxybutyl (meth)acrylate, caprolactone-modified hydroxyl (meth)acrylate (e.g., "Prolactocel FM" made by Daicel Chemical Industries, Ltd.), mono(meth)acrylate of polyester diol obtained from phthalic acid and propylene glycol, mono(meth)acrylate of polyester diol obtained from succinic acid and propylene glycol, polyethylene glycol mono(meth)acrylate, polypropylene glycol mono(meth)acrylate, trimethylolpropane di(meth)acrylate, pentaerythritol tri(meth)acrylate, glycerin di(meth) acrylate, 2-hydroxy-3-(meth)acryloyloxypropyl methacrylate, and (meth)acrylic acid adduct of epoxy esters represented by the formulas [A] to [G] below.

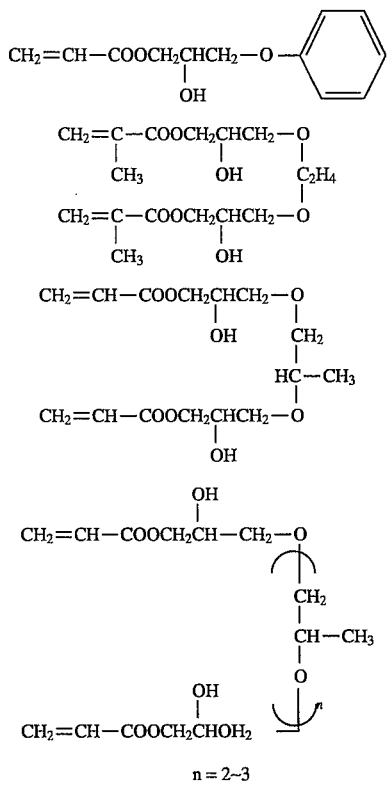

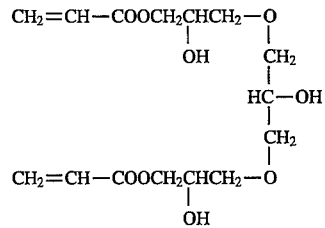

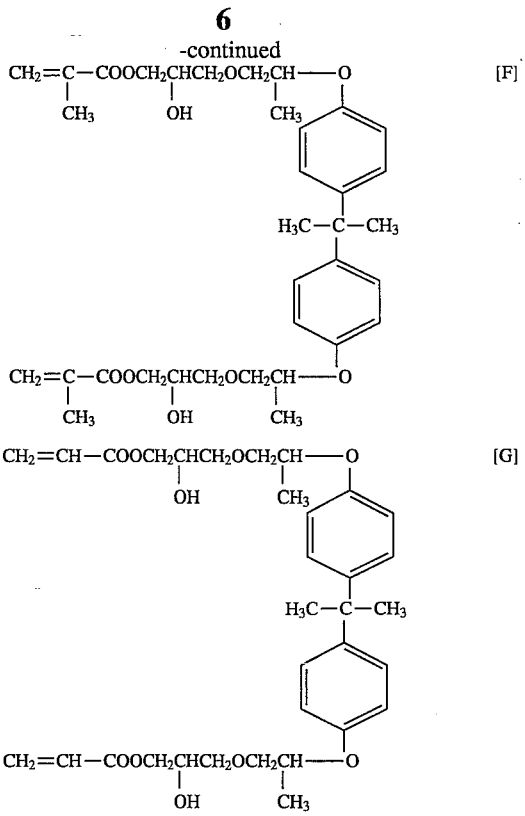

Carboxyl group-containing vinyl monomer such as (meth)acrylic acid, crotonic acid, itaconic acid, maleic acid, and fumaric acid.

Sulfonic group-containing vinyl monomers such as vinylsulfonic acid, styrenesulfonic acid, and sulfoethyl (meth)acrylate.

Acid phosphate ester vinyl monomers such as 2-(meth)acryloyloxyethyl acid phosphate, 2-(meth)acryloyloxypropyl acid phosphate, 2-(meth)acryloyloxy-3-chloropropyl acid phosphate, and 2-methacryloyloxyethylphenyl phosphate.

Vinyl monomer having a methylol group, such as N-methylol (meth)acrylamide.

They may be used alone or in combination with one another. (Meth)acrylate esters having a hydroxyl group are most desirable in consideration of the reactivity of the isocyanate group in the isocyanate compound (b).

The vinyl group-containing compound (V) is obtained by the reaction of polyol (a), isocyanate compound (b), and monomer (c). Their ratio in the reaction is not specifically limited; however, the amount of polyol (a) should be 15–93 wt %, preferably 35–60 wt %, the amount of isocyanate compound (b) should be 5–65 wt %, preferably 15–35 wt %, and the amount of monomer (c) should be 2–80 wt %, preferably 5–50 wt %, with the total amount of (a)+(b)+(c) being 100 wt %.

The polyol (a) is a component to impart strength and elastic properties to the crosslinked spherical fine particles. With an amount less than 15 wt %, it does not fully exhibit its features. With an amount in excess of 93 wt %, it lowers the relative amounts of isocyanate compound (b) and monomer (c), resulting in the crosslinked spherical fine particles which are poor in chemicals (acids and alkalis) and organic solvents and weathering resistance. The isocyanate compound (b) and the monomer (c) are components to introduce urethane groups and unsaturated groups capable of radical polymerization into the vinyl group-containing compound (V) respectively. Therefore, the above-mentioned amounts are recommended so as to provide the crosslinked spherical fine particles having outstanding mechanical characteristics (such as toughness and elastic properties) and chemical resistance.

The vinyl group-containing compound (V) capable of radical polymerization should have a number-average molecular weight in the range of 1,000 to 30,000. With a molecular weight lower than 1,000, it gives rise to the crosslinked spherical fine particles which are poor in mechanical properties (toughness and elastic properties) and chemicals (acids and alkalis) and organic solvents and weathering resistance. With a molecular weight in excess of 30,000, it will be slow in radical polymerization.

If the crosslinked spherical fine particles are to have good flexibility and recovery properties, it is desirable that the vinyl group-containing compound (V) capable of radical polymerization should have a molecular weight of 5000–20000.

The amount of the vinyl group-containing compound (V) in the component [M] capable of radical polymerization (referred to as polymerizable component [M] hereinafter) may vary in a broad range according to the intended use. It's ratio in the polymerizable component [M] should be more than 20 wt % if the crosslinked spherical fine particles are to be superior particularly in mechanical characteristics such as toughness and elastic properties.

In other words, the polymerizable component [M] may contain not only the above-mentioned vinyl group-containing compound (V) but also other monomer (Mo) capable of radical polymerization as an optional copolymer component. Examples of the optional monomer (Mo) capable of radical polymerization include those of the above-mentioned monomer (c) used for the production of the vinyl group-containing compound (V). Additional examples include the following.

Alkyl esters of (meth)acrylic acid such as methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, 2-ethylhexyl (meth)acrylate, n-octyl (meth)acrylate, isooctyl (meth)acrylate, nonyl (meth)acrylate, lauryl (meth)acrylate, stearyl (meth)acrylate, cyclohexyl (meth)acrylate, t-butylcyclohexyl (meth)acrylate, and methyltriglycol (meth)acrylate.

Polyfunctional esters of (meth)acrylic acid such as trimethylolpropane tri(meth)acrylate, dipentaerythritol hexa(meth)acrylate, 1,4-butanediol di(meth)acrylate, 1,6-hexanediol di(meth)acrylate, neopentyl glycol di(meth)acrylate, ethylene glycol di(meth)acrylate, and pentaerythritol tri(meth)acrylate.

Epoxy group-containing vinyl monomers such as glycidyl (meth)acrylate.

Nitrogen-containing vinyl monomers such as (meth)acrylylamide, N,N-dimethylaminoethyl (meth)acrylate, vinyl pyridine, and vinyl imidazole.

Halogen-containing vinyl monomers such as vinyl chloride and vinylidene chloride.

Aromatic vinyl monomers such as styrene, p-methylstyrene, α-methylstyrene, vinyltoluene, and divinylbenzene.

Vinyl ester such as vinyl acetate. Vinyl ethers.

Unsaturated cyan compounds such as (meth)acrylonitrile.

Diesters of unsaturated dibasic acids such as fumaric acid, maleic acid, and itaconic acid.

Fluorine-containing vinyl monomers such as trifluoroethyl (meth)acrylate, tetrafluoropropyl (meth)acrylate, octafluoropentyl (meth)acrylate, heptadecafluorodecyl (meth)acrylate, and fluoroolefins.

Silicon-containing vinyl monomers such as vinyltrimethoxysilane, vinyltriethoxysilane, vinyltris (β-methoxyethoxy)silane, γ-(meth)acryloyloxypropyltrimethoxysilane, γ-(meth)acryloyloxypropyltriethoxysilane, and γ-(meth)acryloyloxypropylmethyldimethoxysilane, They may be used alone or in combination with one another. For the resulting crosslinked spherical fine particles to have good weathering resistance, it is desirable that (meth)acrylate esters account for more than 50 wt % in the monomer (Mo) capable of radical polymerization. Furthermore the case where the resulting crosslinked spherical fine particles are to be incorporated into a coating material or peelable adhesive, it is desirable that a part or all of the monomer (Mo) capable of radical polymerization should be a (meth)acrylic ester having an active hydrogen, because the resulting coating film or peelable adhesive has better durability when the crosslinked spherical fine particles contain functional groups reactive with the vehicle component.

According to the present invention, the crosslinked spherical fine particles are produced by radical polymerization of the above-mentioned polymerizable component [M] in the dispersed state in the solvent [S] which does not substantially dissolve the polymerizable component [M]. The particles have the crosslinked structure, which is formed when the polymerization is performed together with the vinyl group-containing compound (V) which contains 2 or more unsaturated groups capable of radical polymerization in the molecule, or the monomer (Mo) capable of radical polymerization which is a polyfunctional monomer such as polyfunctional (meth)acrylic ester and divinylbenzene. Both methods may be used together. In the case where the polymerizable component [M] consists of the vinyl group-containing compound (V) alone, it is necessary to employ the first method.

In the case where the first method is used, the vinyl group-containing compound (V) does not always need to be a homogeneous compound having 2 or more unsaturated groups capable of radical polymerization in the molecule. In other words, the vinyl group-containing compound (V) may be obtained as a mixture of compounds containing a different amount of unsaturated groups capable of radical polymerization in the molecule, because it is a reaction product of polyol (a), isocyanate compound (b), and monomer (c). Therefore, the vinyl group-containing compound (V) can be used without removal of impurities so long as it contains reaction products having 2 or more unsaturated groups capable of radical polymerization in the molecule. The reaction products should contain 1 or more, preferably 1.5 or more, unsaturated groups capable of radical polymerization in the molecule on average, because the vinyl group-containing compound (V) is a very important component for the feature of the present invention.

No specific restrictions are imposed on the process of producing the vinyl group-containing compound (V) from polyol (a), isocyanate compound (b), and monomer (c). The first process consists of reacting polyol (a), isocyanate compound (b), and monomer (c) all at once. [This process is referred to as process (I) for producing the vinyl group-containing compound hereinafter.] The second process consists of reacting polyol (a) and isocyanate compound (b), thereby forming an intermediate having terminal isocyanate groups, and subsequently reacting the intermediate with monomer (c). [This process is referred to as process (II) for producing the vinyl group-containing compound hereinafter.] The third process consists of reacting isocyanate compound (b) with monomer (c), thereby forming an intermediate having terminal isocyanate groups, and subsequently reacting the intermediate with polyol (a). [This process is referred to as process (III) for producing the vinyl group-containing compound hereinafter.] Any of the above-mentioned three processes may be used. In the case of process (I) or (III), the resulting product tends to contain the reaction product of polyol (a) and isocyanate compound (b) and/or the reaction product of isocyanate (b) and monomer (c) as impurities. In the case of process (II), the resulting product contains only a small amount of the above-mentioned impurities and consists mainly of the desired vinyl group-containing compound (V) having 2 or more vinyl groups in the molecule. Therefore, in the case where the crosslinked structure is formed by the above-mentioned first method, it is desirable to employ the process (II) for producing the vinyl group-containing compound. Incidentally, the process (II) for producing the vinyl group-containing compound includes the process which consists of reacting all of polyol (a) with a portion of isocyanate compound (b), thereby forming an intermediate having terminal hydroxyl groups, subsequently reacting the intermediate with the remainder of isocyanate compound (b), thereby forming an intermediate having terminal isocyanate groups, and finally reacting the intermediate with monomer (c).

The crosslinked spherical fine particles of the present invention may be colored as desired with a colorant such as dye and/or pigment. The coloring may be accomplished by adding a colorant to the polymerizable component [M] prior to polymerization for the crosslinked spherical fine particles, or by adding a colorant to the crosslinked spherical fine particles after radical polymerization. These two methods may be used in combination with each other.

The crosslinked spherical fine particles of the present invention may contain a variety of additives in an amount not harmful to the feature of the present invention according to the intended use. The additives include a blowing agent (which is intended to make the fine particles porous or hollow), antistatic agent, conducting agent, and UV absorber. These additives may be added in any stage of production; but it is desirable to add them to the raw materials for the crosslinked spherical fine particles.

According to the present invention, the crosslinked spherical fine particles may be produced by polymerizing in the dispersed state the polymerizable component [M] in the solvent [S] which does not substantially dissolve said polymerizable component [M], said polymerizable component [M] containing the vinyl group-containing compound (V) as an essential component and the monomer (Mo) capable of radical polymerization as an optional component.

Examples of the solvent [S] which does not substantially dissolve the polymerizable component [M] include the following.
Water;
Aliphatic hydrocarbons such as n-hexane, isohexane, n-heptane, n-octane, isooctane, decane, ligroin, kerosene, and mineral spirit;
Alcohols such as methyl alcohol, ethyl alcohol, n-propyl alcohol, isopropyl alcohol, butyl alcohol, isobutyl alcohol, and octyl alcohol;
Ethers such as isopropyl other, n-butyl other, and n-hexyl other;
Polyhydric alcohols such as ethylene glycol, propylene glycol, trimethylene glycol, and glycerin;
Amylbenzene and p-cymene.
These solvents may be used alone or in combination with one another. Water and aliphatic hydrocarbons (such as hexane, heptane, and mineral spirit) are most suitable from the standpoint of dispersion and reactivity of the polymerizable component [M].

The above-mentioned radical polymerization in the dispersed state may be facilitated by the aid of a dispersing agent [D]. In the case where the solvent [S] is water, a desired dispersing agent [D] is a water-soluble compound [Dw], especially a water-soluble polymeric compound and/or water-soluble surface active agent.

Examples of the water-soluble polymeric compound include the following.
Natural polymeric compounds such as gelatin and starch;
Semi-synthetic polymeric compounds such as methyl cellulose, carboxymethyl cellulose, and hydroxyethyl cellulose; and
Synthetic polymeric compounds such as polyvinyl alcohol, polyvinyl methyl ether, polyvinyl pyrrolidone, poly(meth)acrylic acid and sodium salt thereof, poly(meth)acrylamide, polyoxyethylene glycol, partially saponified polyvinyl acetate, polymaleic acid, and styrene-maleic acid copolymer.
They may be used alone or in combination with one another. A water-soluble synthetic polymeric compound is most desirable.

Examples of the water-soluble surface active agent include anionic, cationic, and nonionic surface active agents, which may be used alone or in combination with one another.

Examples of the anionic surface active agent include alkyl sulfates such as alkali metal lauryl sulfate, ammonium lauryl sulfate, alkali metal dodecylbenzenesulfonate, ammonium dodecylbenzenesulfonate, alkali metal stearyl sulfate, and ammonium stearyl sulfate; and dialkylsulfosuccinate, polyoxyethylene alkyl phenyl ether sulfate, polyoxyethylene alkyl phenyl ether sulfonate, alkali metal salt of sulfonated paraffin, and ammonium salt of sulfonated paraffin.

Examples of the nonionic surface active agent include polyoxyethylene higher alcohol ether, polyoxyethylene alkyl aryl ether, polyoxyethylene sorbitan mono-, di-, and trilauryl esters, polyethylene glycol mono- and dilauryl esters, and polyethylene glycol mono and distearyl ester.

Examples of the cationic surface active agent include lauryltrimethyl ammonium halide, lauryltriethyl ammonium halide, alkylbenzyldimethyl ammonium halide, and alkylbenzyldiethyl ammonium halide.

They may be used alone or in combination with one another. It should be kept in mind that coagulation will take place when the anionic surface active agent and the cationic surface active agent are used together.

The above-mentioned water-soluble polymeric compound and water-soluble surface active agent may be used alone or in combination with one another as the dispersing agent [D].

In the case where the solvent [S] is an organic solvent (not water), the preferred dispersing agent [D] is a polymeric compound soluble in the organic solvent. Examples of such polymeric compounds include sorbitan fatty acid ester such as sorbitan monolaurate and sorbitan monostearate; fatty acid esters such as glycerin fatty acid ester, polyglycerin fatty acid ester, and sucrose fatty acid ester; alkylene oxide adducts such as ethylene oxide adduct of nonyl phenol and poly(propylene oxideethylene oxide) block compound; alkyd resins such as alkyd resin, rosin-modified alkyd resin, and urethane-modified alkyd resin. One or more of them should be selected according to the kind of the organic solvent used. In the case where the solvent [S] is an aliphatic hydrocarbon, the preferred dispersing agents are sorbitan fatty acid ester, alkyd resin, rosin-modified alkyd resin, and urethane-modified alkyd resin, particularly alkyd resin and/or urethane-modified alkyd resin and desirable from the standpoint of dispersibility.

The dispersing agent [D] should be added in an amount of 0.001–20 wt %, preferably 0.01–15 wt %, for the polymerizable component [M]. Also, the dispersing agent [D] may be added at any time when it is adequate for the polymerizable component [M] to be dispersed into the solvent [S]. The method of its addition to the reaction system is not specifically limited. For example, the dispersing agent [M] may be added alone or in the form of dispersion or solution in the polymerizable component [M] and/or the solvent [S]. The two methods may be combined together.

The polymerizable component [M] may be dispersed into the solvent [S] by either of the following two methods.

(1) The polymerizable component [M] is added all at once or slowly with stirring to the solvent [S], so as to give a normal phase dispersion, in which the solvent [S] is the continuous phase. (This method is referred to as normal phase dispersing method hereinafter.)

(2) A part of the solvent [S] is added all at once or slowly with stirring to the polymerizable component [M], so as to give a reversed phase dispersion, in which the polymerizable component [M] is the continuous phase. Subsequently, the remainder of the solvent [S] is added to bring about phase inversion, thereby to give a normal phase dispersion, in which the polymerizable component [M] is the continuous phase. (This method is referred to as reversed phase dispersion-phase inversion method hereinafter.)

Both methods give rise to truly spherical fine particles which will produce a profound effect when used for the above-mentioned applications.

The former method tends to give rise to crosslinked spherical fine particles composed of particles of large diameters and small diameters (or having a broad particle size distribution). The latter method tends to give rise to crosslinked spherical fine particles composed of particles of uniform diameter (or having a narrow particle size distribution). Therefore, the latter method is usually desirable for most applications. This holds true particularly in the case where the crosslinked spherical fine particles having a narrow particle size distribution are used to secure a high gap accuracy for the spacer of liquid-crystal display units.

The reversed phase dispersion-phase inversion method should be applied in such a manner that the reversed phase dispersion (which is the first product and in which the polymerizable component [M] is the continuous phase) contains the polymerizable component [M] and the solvent [S] in a ratio of from 40/60 to 95/5 by weight. With a ratio lower than 40/60, the reversed phase dispersion is not stable and the normal phase produced from it gives rise to crosslinked spherical fine particles having a broad particle size distribution. With a ratio higher than 95/5, the phase inversion from the reversed phase dispersion into the normal phase dispersion does not take place smoothly, giving rise to crosslinked spherical fine particles having a broad particle size distribution and containing a large amount of deformed spherical particles.

The dispersion of the polymerizable component [M] into the solvent [S] may be accomplished by means of a high-shear mixer such as homogenizer and homomixer or a low-shear mixer provided with mixing blades of paddle type or anchor type. More than one kind of mixer may be used.

Prior to dispersion into the solvent [S], the polymerizable component [M] may be diluted with an adequate solvent so as to lower its viscosity, thereby improving its dispersibility. Examples of such a solvent include ketones such as methyl ethyl ketone and methyl isobutyl ketone; esters such as ethyl acetate and butyl acetate; and aromatic solvents such as toluene and xylene.

The polymerizable component [M] may undergo radical polymerization by the aid of an initiator. Examples of the initiator include ordinary radical polymerization initiators such as azobisisobutyronitrile, azobisvaleronitrile, benzoyl peroxide, cumene hydroperoxide, and di-t-butyl peroxide. The initiator should be used in an amount of 0.01–20 wt %, preferably 0.1–10 wt %, for the polymerizable component [M]. The reaction temperature should be in the range from room temperature to 200° C., preferably from 60° C. to 150° C.

The cross-linked spherical fine particles obtained as mentioned above have a particle diameter of 0.5 to 2000 μm, depending on the manufacturing conditions. They are spherical or ellipsoidal, and may contain some aggregates of particles due to aggregation that might take place during polymerization. Those particles which are not spherical are also within the scope of the present invention.

According to the present invention, the crosslinked spherical fine particles have an average particle diameter which can be controlled by properly selecting the kind and amount of the dispersing agent [D], the concentration of the polymerizable component [M] in the solvent [S], and the intensity of stirring. The most effective control is achieved by properly selecting the amount of the dispersing agent [D] and the intensity of stirring. The larger the amount of the dispersing agent [D], the smaller the average particle diameter. Conversely, the smaller the amount of the dispersing agent [D], the larger the average particle diameter. The higher the intensity of stirring, the smaller the average particle diameter. Conversely, the lower the intensity of stirring, the larger the average particle diameter.

After radical polymerization, the resulting crosslinked spherical fine particles are obtained in the form of dispersion in the solvent [S]. They may be separated from the solvent [S] by filtration or centrifugation, followed by washing and drying and obtained as powder. They may also be kept wet with the solvent [S] or any other solvent in place of the solvent [S].

The thus obtained crosslinked spherical fine particles have superior mechanical characteristics (such as hardness, strength, and elastic properties) and good resistance to chemicals (acids and alkalis) and solvents and weathering, as mentioned above. Therefore, they are useful as a filler, delustering agent, and reinforcing agent for paints, plastics, rubber and so on; a spacer for liquid-crystal display units; a carrier on toner for electrostatic duplicators; and a filler for cosmetics and toothpaste.

When combined with an adequate binder resin, the crosslinked spherical fine particles may be made into a coating composition which gives rise to a coating film with a good appearance and feel. Also, when combined with an adequate pressure-sensitive adhesive, they may be made into a peelable pressure-sensitive adhesive.

The coating composition may be used as a paint to be applied to a variety of substrates for decorative finish. It may also be formed into film or applied to a sheetlike substrate to form coating film. The resulting products are useful as tablecloth, book cover, wall paper, and other surface finishing materials owing to their good appearance and feel. Moreover, these films or sheetlike products may be provided with an adhesive layer on one side thereof. The resulting products are useful as interior and exterior decorative materials (such as wall paper). In addition, the peelable pressure-sensitive adhesive may be applied to a sheetlike substrate such as paper to give a peelable pressure-sensitive article such as tack memo. These products are explained in detail in the following.

Coating Composition

The product which is obtained by dispersing the crosslinked spherical fine particles into a binder resin is the coating composition, which gives rise to a coating film having a unique leatherlike or velvetlike appearance and feel owing to the above-mentioned characteristic properties of the crosslinked spherical fine particles. The crosslinked spherical fine particles to be used for the coating composition should have an average particle diameter of 1–100 μm, preferably 3–70 μm, and more preferably 5–50 μm. With a particle diameter smaller than 1 μm, the crosslinked spherical fine particles will be buried in the coating film, with the result that the coating film lacks the leatherlike or velvetlike appearance and feel. With a particle diameter larger than 100 μm, the crosslinked spherical fine particles will give rise to a coating film with a rough feel.

The binder resin to be combined with the crosslinked spherical fine particles functions to fix the crosslinked spherical fine particles onto the surface of a variety of substrates. It is not specifically limited so long as it is capable of forming a coating film at normal temperature or with heating. It may be selected from any known binder resins for paints. Examples of the binder resins include acrylic resin, vinyl resin, alkyd resin, polyester resin, epoxy resin, urethane resin, fluorocarbon resin, olefine resin, polyamide resin, siloxane resin, silicone-modified polyester resin, and silicone-modified acrylic resin. Typical examples of each resin are shown below.

Acrylic Resins

Resins which are obtained by homopolymerization or copolymerization of acrylic monomers exemplified above such as polymerizable vinyl monomer (c) or other polymerizable monomer (Mo), especially a monomer composed mainly of alkyl (meth)acrylate.

Vinyl Resins

Vinyl chloride resins and vinylidene chloride resins which are obtained by homopolymerization or copolymerization of a monomer composed mainly of vinyl chloride or vinylidene chloride.

Alkyd Resins

Alkyd resins which are obtained by modifying an unsaturated polyester resin with a higher fatty acid having an unsaturated bond. The unsaturated polyester is the one which is obtained by condensation reaction of a polyol explained above as a raw material for the polyester polyol used in the present invention.

Polyester Resins

Saturated polyester resins which are obtained by condensation reaction of a polyol explained above as a raw material for the polyester polyol used in the present invention.

Epoxy Resins

Resins having 2 or more epoxy groups in the molecule, such as an addition polymer of bisphenol A and glycidyl ether and a reaction product of phenolic resin and epichlorohydrin.

Urethane Resins

Urethane resins which are obtained by reaction of an acrylic resin, alkyd resin, or polyester resin having 2 or more hydroxyl groups in the molecule with the above-mentioned isocyanate compound (b) used in the present invention.

Fluorocarbon Resins

Fluorocarbon resins which are obtained by copolymerization of vinyl fluoride, vinyl difluoride (vinylidene fluoride), or vinyl trifluoride with an optional comonomer.

Olefin Resins

Homopolymers or copolymers (or chlorinated products thereof) of olefins such as ethylene and propylene.

Polyamide Resins

Nylon and copolymerized nylon, and polyamide resins which are obtained by reaction of a dimerized unsaturated fatty acid (soybean oil) with a diamine.

Siloxane Resins

Siloxane resins (or silicone resins) which are obtained by dehydration-condensation of organochlorosilanes.

Silicone-Modified Polyester Resins

Those which are obtained by modifying polyester resins with the above-mentioned siloxane resin.

Silicone-Modified Acrylic Resins

Those which are obtained by modifying acrylic resins with the above-mentioned siloxane resin.

These binder resins may be used alone or in combination with one another, and their choice depends on the performance required for the coating film, for example, physical properties (such as toughness and elastic properties) and resistance to chemicals (such as acids and alkalis) and organic solvents and weathering. Of course, they may be of lacquer type.

Preferable among these binder resins are acrylic resin, polyester resin, epoxy resin, urethane resin, olefin resin, silicone-modified polyester resin, and silicone-modified acrylic resin, which exhibit good affinity for the crosslinked spherical fine particles and also good adhesion to the substrate and form a durable coating film without any adverse effect on the appearance such as clarity.

Furthermore, these binder resins should preferably be flexible and tough so that they permit the coating composition of the present invention to fully exhibit its features. This requirement will be met by the adequate selection of chemical structure, molecular weight, glass transition point, crosslink density, and crosslinking agent for the binder resins.

The content of crosslinked spherical fine particles in the coating composition may be varied over a broad range. With an excessively small content, the resulting coating film lacks the leatherlike or velvetlike appearance and feel. With an excessively large content, the crosslinked spherical fine particles drop off from the coating film during use on account of their insufficient adhesion. The desirable content of crosslinked spherical fine particles in the coating composition should be 3 to 80 wt % on the basis of solids. In the case where it is necessary to impart a delustering appearance to the coating film, the desirable content of crosslinked spherical fine particles in the coating composition should be 10 to 80 wt % on the basis of solids. The thickness of the coating film should be equal to or greater than the average particle diameter of the crosslinked spherical fine particles added. This requirement is important for uniform coating films.

There are no specific restrictions on the preparation of the coating composition from the crosslinked spherical fine particles and binder resin. Any method may be employed which consists of mixing a solution or dispersion containing a binder resin and a dispersion containing the crosslinked spherical fine particle, or dissolving or dispersing a solid binder resin in a dispersion of the crosslinked spherical fine particles, or dispersing the crosslinked spherical fine particles (in powder form) into a solution or dispersion of a binder resin. Mixing may be facilitated by an adequate mixing machine.

The coating composition may be incorporated with other optional components in addition to the crosslinked spherical fine particles and binder resin. Such optional components include inorganic fine particles and organic fine particles (which do not fall under the category of the above-mentioned crosslinked spherical fine particles). And they're used within the scope which do not spoil the properties of the present invention. Other examples of the optional components include commonly used diluent solvents, pigments, fillers, hardening catalysts, paint additives, and resin modifiers (such as cellulose derivative), which should be selected according to the required characteristic properties of the coating composition and the required performance of the coating film.

The coating composition of the present invention may be colored by any method. Coloring may be accomplished by using colored crosslinked spherical fine particles or colored binder resin or both. In the case where the binder resin is transparent, the resulting coating film makes the color of the substrate visible through it. The combination of a transparent or colored binder resin with two or more kinds of crosslinked spherical fine particles having different colors (and with a colored substrate) gives rise to a coating film which takes on a deep "pepper-and-salt" color.

Upon application onto a substrate, the coating composition forms a coating film which has a sophisticated appearance and feel resembling that of natural leather and velvet. The coating film may have a delustered surface depending on the amount and particle diameter of the crosslinked spherical fine particles it contains. The coating composition may be applied to a variety of substrates such as metal, plastics, paper, wood, and inorganic building materials to greatly improve their appearance and feel.

Filmlike Articles and Sheetlike Articles

The above-mentioned coating composition may be formed into film to give a filmlike article which has an appearance and feel similar to those of natural leather and velvet. Also, the coating composition may be applied to a sheetlike substrate to give a sheetlike article which has an appearance and feel similar to those of natural leather and velvet. Examples of the sheetlike substrate include plastics and rubber (of solid or resilient open- or closed-cell structure), metal, and inorganic materials in sheet form, and paper, woven fabric, knitted fabric, and nonwoven fabric. In addition, the coating composition may be applied to the surface of natural and synthetic leathers to improve their appearance and chemical resistance. The application of the coating composition onto a sheetlike substrate may be accompanied by under coating for the better adhesion of the coating film.

The filmlike article is not specifically limited in thickness; however, it should preferably be 30 $\mu$m to 500 $\mu$m thick from the standpoint of handling and strength. The sheetlike article should have a coating thickness in the range of 20 $\mu$m to 2000 $\mu$m. The thus obtained filmlike article and sheetlike article will find a large variety of uses as decorative film and sheet such as table cloth and table mat. They will also find other uses as surface decorative materials in place of leather and as interior and exterior decorative materials for walls, building materials, furniture, vehicles, etc. In the latter case, they may be coated with an adhesive layer or they may be applied to the substrate having an adhesive layer thereon.

Adhesive Filmlike Article and Adhesive Sheetlike Article

The above-mentioned filmlike article and sheetlike article may be coated on one side thereof with an adhesive to make them more practically useful as wallpaper and other interior and exterior decorative materials for vehicles, boxes, bookshelves, desks, and furniture. The adhesive used for this purpose is not specifically limited; it includes acrylic-based, natural rubber-based, synthetic rubber-based, and silicone-based adhesives of aqueous solution type, solvent solution type, emulsion type, and solventless type. It also includes pressure-sensitive adhesives, remoistening adhesives, and hot-melt type adhesives. Most popular among them are pressure-sensitive adhesives and remoistening adhesives. The usage of a pressure-sensitive adhesive is facilitated if the adhesive layer is covered with release paper which is removed just before bonding to the substrate.

The adhesive filmlike article may be produced by any method which consists of applying an adhesive to a part or all of one side of the filmlike article prepared from the coating composition, followed by drying, if necessary, or applying an adhesive partly or entirely to release paper and then bonding the release paper to one side of the filmlike article.

The adhesive sheetlike article may also be produced by any method which consists of applying the coating composition to one side of a sheetlike substrate, thereby forming a coating film, and applying an adhesive to the other side of the sheetlike substrate. The two steps may be performed in reverse order or simultaneously. In this case, too, the adhesive layer may be formed partly or entirely on one side of the sheetlike substrate.

The adhesive sheetlike article may also be produced by attaching a two-sided pressure-sensitive adhesive tape to one side of a single-layered film formed from the coating composition or to a back side of the sheetlike article on which a coating film is formed from the coating composition.

The adhesive layer is not specifically limited in thickness. A proper thickness, usually from 10 $\mu$m to 1000 $\mu$m should be selected in consideration of the type and use of adhesive.

Peelable Pressure-Sensitive Adhesive

The above-mentioned crosslinked spherical fine particles may be mixed with a proper amount of pressure-sensitive adhesive to give a high-performance peelable pressure-sensitive adhesive, which contains the fine particles dispersed in the adhesive as a continuous phase. When applied to an adequate substrate such as paper, the peelable pressure-sensitive adhesive permits the crosslinked spherical fine particles to be partly exposed from its surface, with the remainder embedded therein. In other words, the peelable pressure-sensitive adhesive forms its surface, with a portion of the crosslinked spherical fine particles projecting from the adhesive, forming minute non-adhesive projections uniformly distributed on the surface. Since these crosslinked spherical fine particles have elastic properties as mentioned above, they are slightly deformed when the surface of the peelable pressure-sensitive adhesive is pressed against an object. In addition, the surface minute projections resulting from the crosslinked spherical fine particles reduce the effective area of the pressure-sensitive adhesive in proportion to their exposed area. This, together with the force of elastic recovery exerted by the deformed fine particles, produces the good effect of repeelability.

For the effective peelability, it is desirable that the crosslinked spherical fine particles have a uniform particle diameter from 3 μm to 70 μm, preferably from 5 μm 50 μm on average. The mixing ratio of the crosslinked spherical fine particles and the pressure-sensitive adhesive should be 3/97 to 80/20 parts by weight, preferably 20/80 to 70/30 parts by weight on solid basis.

There are no specific restrictions on the kind of the pressure-sensitive adhesive to be mixed with the crosslinked spherical fine particles. It is possible to use any known pressure-sensitive adhesive of thermoplastic or thermosetting acrylic type, natural rubber type, synthetic rubber type, and silicone type. They may be of solvent solution type, emulsion type, hot-melt type, solventless photocurable type and so on. An acrylic pressure-sensitive adhesive of solvent solution type is particularly desirable from the standpoint of durability.

This acrylic pressure-sensitive adhesive is obtained by radical copolymerization of a monomer mixture composed of the following compounds (A), (B), and/or (C) [with the total amount of (A), (B), and (C) being 100 wt %], or by radical copolymerization of a monomer mixture composed of the following compounds (A), (B) and/or (C), and (D) [with the total amount of (A), (B), (C), and (D) being 100 wt %].

(A) (Meth)acrylic ester compound represented by the formula below. (one or more kinds) (85–99.99 wt % when compound (D) is not used; 65–96.99 wt % when compound (D) is used together)

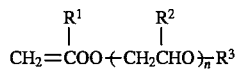

(where $R^1$ and $R^2$ are the same or different, each denoting a hydrogen atom or methyl group; n is 0 or an integer of 1 to 5; and $R^3$ is a $C_{4-12}$ alkyl group when n is 0 and a $C_{1-5}$ alkyl group when n is an integer of 1 to 5.)

(B) Unsaturated compound (B) capable of radical polymerization having a hydroxyl group(s) in the molecule. (one or more kinds) (0.01–5.0 wt %)

(C) Unsaturated compound (C) capable of radical copolymerization having a carboxyl group(s) in the molecule. (one or more kinds) (0.1–10.0 wt %)

(D) Unsaturated compound (D) capable of radical polymerization other than mentioned above. (one or more kinds) (3.0–20.0 wt %)

Examples of compound (A) include butyl (meth)acrylate, isobutyl (meth)acrylate, sec-butyl (meth)acrylate, tert-butyl (meth)acrylate, amyl (meth)acrylate, isoamyl (meth)acrylate, hexyl (meth)acrylate, cyclohexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, dodecyl (meth)acrylate, butoxyethyl (meth)acrylate, ethylcarbitol (meth)acrylate, methyltriglycol (meth)acrylate, and dipropylene methyl ether (meth)acrylate. They may be used alone or in combination with one another.

Compound (A) is an essential component to impart tackiness and adhesion to the pressure-sensitive adhesive. The amount of compound (A) in the total amount of the raw materials should be 65–96.99 wt % when compound (D) is used together or 85–99.99 wt % when compound (D) is not used together. With an amount less than the lower limit, compound (A) does not impart sufficient initial tackiness and adhesion to the pressure-sensitive adhesive. With an amount in excess of the upper limit, component (A) renders the pressure-sensitive adhesive poor in peelability.

Examples of compound (B) include (meth)acrylate esters having a hydroxyl group such as hydroxyethyl (meth)acrylate, hydroxypropyl (meth)acrylate, hydroxybutyl (meth)acrylate, caprolactone-modified hydroxy (meth)acrylate (e.g., "Placsel FM" made by Daicel Chemical Industries, Ltd.), mono(meth)acrylate of polyester diol tained from phthalic acid and propylene glycol, mono(meth)acrylate of polyester diol obtained from succinic acid and propylene glycol, polyethylene glycol mono(meth)acrylate, and polypropylene glycol mono(meth)acrylate. They may be used alone or in combination with one another.

Examples of compound (C) include unsaturated monobasic acids such as acrylic acid, methacrylic acid, and crotonic acid; and unsaturated dibasic acids such as maleic acid, fumaric acid, itaconic acid, and citraconic acid, and monoesters thereof. They may be used alone or in combination with one another.

Compounds (B) and (C) are a crosslinking component and produce the same effect of imparting peelability to the pressure-sensitive adhesive. Compounds (B) and (C) may be used individually or in combination with each other. The content of compound (B) should be 0.01–5.0 wt %, preferably 0.1–3 wt %, in the total amount of the raw material mixture. The content of compound (C) should be 0.1–10.0 wt %, preferably 0.5–5 wt %, in the total amount of the raw material mixture. Compound (B) and/or compound (C) in an amount less than specified above do not impart sufficient peelability to the pressure-sensitive adhesive. Compound (B) and/or compound (C) in an amount more than specified above cause the pressure-sensitive adhesive to have a low tack level. Compound (B) is preferable to compound (C), and the best result is obtained when they are used together.

Examples of compound (D) include aliphatic unsaturated hydrocarbons such as ethylene and butadiene; halogen-substituted aliphatic unsaturated hydrocarbons such as vinyl chloride; aromatic unsaturated hydrocarbons such as styrene, α-methylstyrene, and divinylbenzene; vinyl esters such as vinyl acetate; vinyl ethers; esters of allyl alcohol with a variety of organic acids and ethers of allyl alcohol with a variety of alcohols; unsaturated cyan compounds such as acrylonitrile; unsaturated amide compounds such as (meth)acrylamide; unsaturated glycidyl compounds such as glycidyl (meth)acrylate; alkyl (meth)acrylates (excluding $C_{4-12}$ alkyls); aryl (meth)acrylates; esters of unsaturated monobasic carboxylic acids such as crotonic acid; and diesters of unsaturated basic carboxylic acids such as maleic acid and fumaric acid. They may be used alone or in combination with one another. Most desirable among them are vinyl acetate, methyl acrylate, and ethyl acrylate, which provide the balanced tack and peelability.

Unsaturated compound (D) capable of radical polymerization is not essential; but it may be omitted depending on the combination of compounds (A), (B), and/or (C). For better peelability, compound (D) should be added in an amount less than 20 wt %, preferably 3.0–20.0 wt %, to the raw material mixture. With an amount in excess of 20 wt %, compound (D) causes the pressure-sensitive adhesive to have a low level of tack.

The raw material mixture composed of the above-mentioned compounds (A), (B) and/or (C), and (D) may be polymerized by any known method such as solution polymerization, emulsion polymerization, suspension polymerization, and bulk polymerization. Most popular among them are solution polymerization and emulsion polymer.

The pressure-sensitive adhesive obtained as mentioned above may be incorporated with a crosslinking agent so that the peelable pressure-sensitive adhesive as the final product has better peelability. The preferred amount of the crosslinking agent is 0.1–10.0 parts by weight for 100 parts by weight of the nonvolatile matter in the pressure-sensitive adhesive.

Examples of the crosslinking agent include isocyanate compounds, epoxy compounds, melamine compounds, guanamine compounds, and polyvalent metal compounds. Examples of the isocyanate compounds include the isocyanate compound (b) exemplified above as the raw material for the crosslinked spherical fine particles. Preferred isocyanate compounds are "Colonate L" and "Colonate EH" (made by Nippon Polyurethane Kogyo Co., Ltd.); "Sumidule N" and "Sumidule L" (made by Sumitomo Bayer Urethane Co., Ltd.); "Sumidule IL" "Sumidule HL" (made by Bayer A. G.). Examples of the epoxy compounds include polyglycidyl compounds such as trimethylolpropane triglycidyl ether and diycidylamine, and epoxy resin of bisphenol A-epichlorohydrin type. Examples of the melamine compounds include preliminary condensate of melamine-formaldehyde resin and alkyl-etherified product thereof. Examples of the guanamine compounds include preliminary condensates of benzoguanamine, cyclohexane carboguanamine, and norbornane carboguanamine, and alkyl etherified products thereof. Examples of the polyvalent metal compounds include aluminum trisacetylacetonate.

Furthermore, the pressure-sensitive adhesive mentioned above may be incorporated with a proper amount of tackifier (such as rosin ester resin, phenolic resin, xylene resin, xylenephenolic resin, terpenephenolic resin, petroleum resin, cumarone resin, low-molecular weight styrene resin, and terpene resin), thickener (such as polyvinyl alcohol, sodium polyacrylate, carboxymethylcellulose, and methylcellulose), pH regulator (such as ammonia, amine, sodium hydroxide, potassium hydroxide, acetic acid, boric acid, and phosphoric acid), coloring agent (such as pigment and dye), plasticizer, softening agent, antioxidant, filler, and viscosity regulator, according to need.

The thus obtained pressure-sensitive adhesive is combined with the above-mentioned crosslinked spherical fine particles to give the peelable pressure-sensitive adhesive, which exhibits an adequate degree of tack and peelability owing to the synergistic effect of the pressure-sensitive adhesive (which provides an adequate degree of tack) and the crosslinked spherical fine particles (which have good elastic properties).

Peelable Pressure-Sensitive Adhesive Article

The above-mentioned peelable pressure-sensitive adhesive may be applied to one side of a filmlike or sheetlike substrate to give a peelable pressure-sensitive adhesive article, which includes, for example, tack memos, peelable labels, and peelable packaging bags. Examples of the substrate include those which were exemplified above for the adhesive sheetlike articles. A proper substrate should be selected according to the intended use. The peelable pressure-sensitive adhesive article may be produced in the similar manner to that mentioned for the adhesive sheetlike article. It is possible to form the peelable pressure-sensitive adhesive layer on an undercoating. The peelable pressure-sensitive adhesive layer is usually formed by applying to a substrate a uniform mixture of the crosslinked spherical fine particles and the pressure-sensitive adhesive component. However, it is also possible to use the following methods so that the crosslinked spherical fine particles are partly exposed on the surface of the pressure-sensitive adhesive layer. The partly exposed fine particles contribute to improved peelability owing to their elastic properties.

(1) A method which consists of forming on a film or sheet substrate a pressure-sensitive adhesive layer containing no crosslinked spherical fine particles, coating the pressure-sensitive adhesive layer with a dispersion of the crosslinked spherical fine particles in a solvent, followed by drying, and, if necessary, applying pressure to fix the fine particles.

(2) A method which consists of forming on a film or sheet substrate a pressure-sensitive adhesive layer containing no crosslinked spherical fine particles, blowing the crosslinked spherical fine particles to the surface of the pressure-sensitive adhesive layer, and if necessary, applying pressure to fix the fine particles.

The thus obtained peelable pressure-sensitive adhesive material is easily bonded to an object with an adequate degree of adhesion. It can be bonded to and peeled off the object repeatedly without the fear of staining or damaging the object. The pressure-sensitive adhesive exhibits good pressure-sensitive adhesion even at low temperatures owing to the good elastic properties of the crosslinked spherical fine particles. In addition, the pressure-sensitive adhesive retains its peelability over a long period of time at a comparatively high temperature owing to the stable physical and chemical properties of the fine particles.

EXAMPLES

The invention will be understood more readily by reference to the following examples; however, these examples are intended to illustrate the invention and are not to be construed to limit the scope of the invention. Unless otherwise stated, quantities are expressed as percent by weight or parts by weight. The average particle diameter of the spherical fine particles was measured using a Coulter Counter made by Japan Scientific Instrument Co., Ltd.

Production Example 1

In a flask equipped with an oil-water separator and reflux condenser were placed 500 parts of adipic acid, 240 parts of 1,6-hexanediol, 210 parts of neopentyl glycol, 50 parts of trimethylolpropane, and 5 parts of toluene (for azeotropic refluxing). The contents were heated under a nitrogen stream. When the temperature in the flask reached 110° C., the mixture of the raw materials melted and became capable of stirring. Heating was continued with stirring until the temperature reached 145° C., at which refluxing began. Condensation reaction was continued while removing water formed by the condensation reaction. After about 4 hours of reaction, the temperature in the flask reached 240° C. and water was not formed any longer. Thus the reaction was terminated. The resulting polyester polyol ("Aroplats OB-6042", a trade name of Nippon Shokubai Kagaku Kogyo Co., Ltd.) contains 99.0% of solids and has a viscosity of 25.0 St, a hydroxyl value of 148, an acid value of 3.0, a number-average molecular weight of 1300, and a weight-average molecular weight of 4300.

Production Example 2

In the same flask as used in Production Example 1 were placed 540 parts of adipic acid, 290 parts of 1,6-hexanediol, 80 parts of neopentyl glycol, and 90 parts of diethylene glycol. Condensation reaction was carried out in the same way as in Production Example 1. After the condensation reaction was complete, the reaction product was diluted with 211 g of toluene. The resulting polyester polyol ("Aroplats OB-6045", a trade name of Nippon Shokubai Kagaku Kogyo Co., Ltd.) contains 80.3% of solids and has a viscosity of 5.8 St, a hydroxyl value of 38, an acid value of 1.5, a number-average molecular weight of 2100, and a weight-average molecular weight of 4900.

Referential Example 1 (Production of Vinyl Group-Containing Compound Capable of Radical-Polymerization)

In a flask equipped with a stirrer, dry air introducing tube, thermometer, and reflux condenser were placed 563.1 parts of polyester polyol (as a polyol component) ("Aroplats OB-6045", a trade name of Nippon Shokubai Kagaku Kogyo Co., Ltd.) obtained in Production Example 2, 43.5 parts of tolylene diisocyanate (TDI) (as an isocyanate compound component), and 387.4 parts of toluene. The reactants were heated with stirring under dry air and subjected to reaction at 60° C. for 1 hour. To the flask was added 0.02 part of dibutyltin dilaurate, and the reactants were heated to 80° C., at which the reaction was continued for 3 hours. Finally, 6 parts of hydroxyethyl acrylate (HEA) as an active hydrogen-containing polymerizable vinyl monomer capable radical polymerization was added, and the reaction was continued at 80° C. for 2 hours.

Thus there was obtained a 50% toluene solution (30 St viscosity) of vinyl group-containing compound capable of radical polymerization (V-1) having a number-average molecular weight of about 9,500 and a weight-average molecular weight of 30,200.

Referential Example 2 (Production of Vinyl Group-Containing Compound Capable of Radical Polymerization)

In a flask equipped with a stirrer, dry air introducing tube, thermometer, and reflux condenser were placed 240 parts of polyester polyol (as a polyol component) ("Kurapol L-2010", having a hydroxyl value of 53–59, made Kuraray Co., Ltd.), 41 parts of tolylene diisocyanate (TDI) (as an isocyanate compound component), and 230 parts of toluene. The reactants were heated with stirring under dry air and subjected to reaction at 60° C. for 1 hour. To the flask was added 0.02 part of dibutyltin dilaurate, and the reactants were heated to 80° C., at which the reaction was continued for 1 hour. To the flask were further added dropwise 15.3 parts of 3-methyl-1,5-pentanediol (made by Kuraray Co., Ltd.) over 10 minutes and then 270 parts of toluene was added dropwise over 2 hours, during which the reaction temperature was kept at 80° C. The reaction system was cooled to 50° C. or below. To the flask was added 119 parts of "Sumidule N" (containing 75% solids, made by Sumitomo Bayer Urethane Co., Ltd.), followed by thorough mixing and heating to 80° C., at which the reaction was continued for 2 hours. Finally, 114 parts of caprolactone-modified hydroxy (meth)acrylate ("Placsel FM-1", made by Daicel Chemical Industries, Ltd.) was added dropwise over 10 minutes, followed by reaction at 80° C. for 2 hours.

Thus there was obtained a 50% toluene solution (25 St in viscosity) of vinyl group-containing compound capable of radical polymerization (V-2) having a number-average molecular weight of about 12,100 and a weight-average molecular weight of 31,500.

Referential Examples 3 to 5 (Production of Vinyl Group-Containing Compounds Capable of Radical Polymerization)

The same procedure as in Referential Example 1 was repeated to give 50% toluene solutions of vinyl group-containing compounds capable of radical polymerization (V-3), (V-4), and (V-5), respectively, except that the reactants were replaced by those which are shown in Table 1.

TABLE 1

|  | Referential Example 3 | Referential Example 4 | Referential Example 5 |
| --- | --- | --- | --- |
| Vinyl group-containing compound capable of radical polymerization | V-3 | V-4 | V-5 |
| Polyol (parts) | Aroplats* (295.6) | P-400* (75.5) | P-400, PG* (131, 19) |
| Isocyanate (parts) | HMDI* (120) | HMDI, Sumidule N (45, 6) | IPDI* (300) |
| Active hydrogen-containing vinyl monomer capable of radical polymerization (parts) | HEA (84.4) | Placsel FM-1 (373.5) | HEA (50) |
| Solvent (parts) | Toluene (500) | Toluene (498.5) | Toluene (500) |
| Number-average M.W. | ca. 3,300 | ca. 8,200 | ca. 9,200 |
| Weight-average M.W. | ca. 9,500 | ca. 42,000 | ca. 37,500 |
| Viscosity (St) | 2.5 | 15.0 | 38.5 |

*HNDI: Hexamethylene diisocyanate
*IPDI: Isophorone diisocyanate
*Aroplats OB-6042: Polyester polyol obtained in Production Example 1 mentioned above.
*P-400: Propylene
*PG: Propylene glycol Reference Example 6

The same procedure as in Referential Example 1 was repeated to give a mixture (V-1a) of vinyl group-containing compound capable of radical polymerization and ethyl acrylate except that the toluene as a solvent in the reaction system was replaced by ethyl acrylate. The mixture has a viscosity of 41 St, and the vinyl group-containing compound capable of radical polymerization has number-average molecular weight of 9,700 and a weight-average molecular weight of 32,500.

Referential Example 7

In a flask equipped with a stirrer, dry air introducing tube, thermometer, and reflux condenser were placed 177.6 parts of Aroplats OB-6042 (explained above) as a polyol component, 72 parts of HMDI (explained above) as an isocyanate compound, 630 parts of ethyl acrylate, and 70 parts of acrylonitrile. The reactants were heated with stirring under dry air and subjected to reaction at 60° C. for 1 hour. To the flask was added 0.02 part of dibutyltin dilaurate, and the reactants were heated to 80° C., at which the reaction was continued for 3 hours. Finally, 50.4 parts of hydroxyethyl acrylate (HEA) as an active hydrogen-containing polymerizable vinyl monomer was added, and the reaction was continued at 80° C. for 2 hours.

Thus it was obtained that a mixture (V-2a) of vinyl group-containing compound capable of radical polymerization, ethyl acrylate, and acrylonitrile. This mixture has a viscosity of 0.85 St, and the vinyl group-containing compound capable of radical polymerization has a number-average molecular weight of about 3,400 and a weight-average molecular weight of about 9,200.

Example 1

(Production of crosslinked spherical fine particles)

Example 1-1

The vinyl group-containing compound capable of radical polymerization (V-1) obtained in Referential Example 1 was made into crosslinked spherical fine particles. In 100 parts of the solution of V-1 was dissolved 1 part of azobisisobutyronitrile (AIBN). The resulting solution was mixed with 400 parts of 0.5% aqueous solution of polyvinyl alcohol (PVA-205, made by Kuraray Co., Ltd.). The resulting mixture was stirred using a homomixer at 3000 rpm for 5 minutes. The resulting dispersion was diluted with 500 parts of 0.5% aqueous solution of polyvinyl alcohol. The diluted dispersion underwent radical polymerization with stirring at 70° C. for 5 hours under a nitrogen stream in a flask equipped with a stirrer, dry air introducing tube, thermometer, and reflux condenser. The resulting polymer was filtered off and washed with water, followed by dehydration by azeotropic distillation with toluene. After removal of excess toluene, a 30% dispersion was obtained in toluene. The thus obtained crosslinked spherical fine particles were found to have an average particle diameter of 30 μm, with about 30 vol % of the fine particles being in the range of 30±5 μm and about 60 vol % of the fine particles being in the range of 30±10 μm. The fine particles were also found to be soft, tough, and resilient.

Example 1-2

The same procedure as in Example 1-1 was repeated to give a 30% dispersion of crosslinked spherical fine particles in toluene except that the vinyl group-containing compound capable of radical polymerization (V-1) was replaced by V-2 obtained in Referential Example 2. The thus obtained crosslinked spherical fine particles were found to have an average particle diameter of 34 μm, with about 25 vol % of the fine particles being in the range of 34±5 μm and about 55 vol % of the fine particles being in the range of 34±10 μm. The fine particles were also found to be soft, tough, and resilient.

Example 1-3

The vinyl group-containing compound capable of radical polymerization (V-3) obtained in Referential Example 3 was made into crosslinked spherical fine particles in 100 parts of the solution of V-3 was dissolved 1 part of AIBN. The resulting solution was mixed with 400 parts of 0.5% aqueous solution of polyvinyl alcohol. The resulting mixture was stirred using a homomixer at 3000 rpm for 5 minutes. The resulting dispersion was diluted with 500 parts of 0.6% aqueous solution of polyvinyl alcohol (PVA-205, explained above). The diluted dispersion underwent radical polymerization with stirring at 70° C. for 5 hours under a nitrogen stream in a flask uipped with a stirrer, dry air introducing tube, thermometer, and reflux condenser. The resulting copolymer formed by radical polymerization was filtered off and washed with water, followed by drying at 60° C. for 24 hours. The thus obtained crosslinked spherical fine particles were found to have an average particle diameter of 26 μm, with about 35 vol % of the fine particles being in the range of 26±5 μm and about 60 vol % of the fine particles being in the range of 26±10 μm. They were also found to be hard, tough, and resilient.

Examples 1-4 to 1-7

The same procedure as in Example 1-3 was repeated to give crosslinked spherical fine particles, except that the vinyl group-containing compound capable of radical polymerization (V-3) was replaced by V-4, V-5, V-1a, and V-2a, respectively. (The former two are the vinyl group-containing compounds capable of radical polymerization obtained in Referential Examples 4 and 5, respectively; and the latter two are the mixtures of a vinyl group-containing compound capable of radical polymerization and a monomer capable of radical polymerization obtained in Referential Examples 6 and 7, respectively.) The thus obtained crosslinked spherical fine particles were found to have an average particle diameter of 31 μm (Example 1-4), 35 μm (Example 1-5), 30 μm (Example 1-6), and 20 μm (Example 1-7), with about 30 vol % of the fine particles being in the range of ±5 μm and about 60 vol % of the fine particles being in the range of ±10 μm. The fine particles were also found to be hard, tough, and resilient.

Example 1-8

The vinyl group-containing compound capable of radical polymerization (V-7) obtained in Referential Example 7 was made into crosslinked spherical fine particles. In 100 parts of the solution of V-7 was dissolved 1 part of AIBN. The resulting solution was mixed with 400 parts of 0.5% aqueous solution of polyvinyl alcohol. The resulting mixture was stirred using a homomixer at 4000 rpm for 10 minutes. The resulting dispersion was diluted with 500 parts of 0.6% aqueous solution of polyvinyl alcohol (PVA-205, explained above). The diluted dispersion underwent radical polymerization with stirring at 70° C. for 5 hours under a nitrogen stream in a flask equipped with a stirrer, dry air introducing tube, thermometer, and reflux condenser. The resulting polymer obtained by radical polymerization was filtered off and washed with water, followed by drying at 60° C. for 24 hours. The thus obtained crosslinked spherical fine particles were found to have an average particle diameter of 8 μm, with about 95 vol % of the fine particles being in the range of 8±5 μm. They were also found to be hard, tough, and resilient.

Example 1-9

The vinyl group-containing compound capable of radical polymerization (V-1) obtained in Referential Example 1 was made into crosslinked spherical fine particles. In 100 parts of the solution of V-1 was dissolved 1 part of AIBN. The resulting solution was mixed with 400 parts of 0.5% aqueous solution of polyvinyl alcohol (PVA-205, made by Kuraray Co., Ltd.). The resulting mixture was stirred using a homomixer at 2000 rpm for 5 minutes. The resulting dispersion was diluted with 500 parts of 6% aqueous solution of polyvinyl alcohol (PVA-205, explained above). The diluted dispersion underwent radical polymerization with stirring at 70° C. for 5 hours under a nitrogen stream in a flask equipped with a stirrer, dry air introducing tube, thermometer, and reflux condenser. After removal of toluene and excess water by distillation, there was obtained a 30% aqueous dispersion. The thus obtained crosslinked spherical fine particles were found to have an average particle diameter of 95 μm, with about 30 vol % of the fine particles being in the range of 95±5 μm and about 60 vol % of the fine particles being in the range of 95±10 μm. The fine particles were also found to be soft, tough, and resilient.

Example 1-10

The same procedure as in Example 1-3 was repeated to give black crosslinked spherical fine particles, except that the vinyl group-containing compound capable of radical polymerization (V-3) obtained in Referential Example 3 was replaced by a mixture composed of 190 parts of the solution of V-3 and 5 parts of carbon black ("MA-100", made by Mitsubishi Chemical Industries, Ltd.). The thus obtained black crosslinked spherical fine particles were found to have an average particle diameter of 28 μm. They were also found to have the same particle size distribution, hardness, toughness, and resilience as in the case of fine particles obtained in Example 1-3.

Example 1-11

The same procedure as in Example 1-3 was repeated to give white crosslinked spherical fine particles, except that the vinyl group-containing compound capable of radical polymerization (V-3) obtained in Referential Example 3 was replaced by a mixture composed of 80 parts of the solution of V-3 and 10 parts of titanium oxide ("CR-95", made by Ishihara Sangyo Kaisha, Ltd). The thus obtained white crosslinked spherical fine particles were found to have an average particle diameter of 28 μm. They were also found to have the same particle size distribution, hardness, toughness, and resilience as in the case of fine particles obtained in Example 1-3.

Example 1-12

The vinyl group-containing compound capable of radical polymerization (V-3) obtained in Referential Example 3 was made into crosslinked spherical fine particles. To 100 parts of the solution of V-3 was added a resin solution formed by dissolving 20 parts of oil-modified urethane resin ("Arotan 193" made by Nippon Shokubai Kagaku Kogyo Co., Ltd.) in 880 parts of cyclohexane. The resulting mixture was stirred using a homomixer at 4000 rpm for 5 minutes. The resulting dispersion underwent radical polymerization at 70° C. for 5 hours under a nitrogen stream in the same flask as used in Example 1-1. The resulting polymer was filtered off and washed, followed by drying at 60° C. for 24 hours. The thus obtained crosslinked spherical fine particles (in powder form) were found to have an average particle diameter of 26 μm, with about 35 vol % of the fine particles being in the range of 26±5 μm and about 60 vol % of the fine particles being in the range of 26±10 μm. They were also found to be hard, tough, and resilient.

Example 1-13

The vinyl group-containing compound capable of radical polymerization (V-1) obtained in Referential Example 1 was made into crosslinked spherical fine particles. In 100 parts of the solution of V-1 was dissolved 1 part of AIBN. The resulting solution was mixed with 44 parts of 1.0% aqueous solution of polyvinyl alcohol (PVA-205). The resulting mixture was stirred in a flask equipped with a dropping funnel, stirrer, nitrogen introducing tube, thermometer, and reflux condenser, using a paddle-type mixer at 500 rpm for 30 minutes. Thus it was obtained that an inverted phase (W/O type) dispersion in which the vinyl group-containing compound capable of radical polymerization (V-1) constitutes the continuous phase. To this dispersion was added 188 parts of 1.0% aqueous solution of polyvinyl alcohol (PVA-205, explained above) from the dropping funnel, with stirring at 500 rpm over 30 minutes. This mixing step brought about phase inversion, giving rise to a normal phase (O/W type) dispersion, in which water constitutes the continuous phase. This normal phase dispersion underwent radical polymerization at 70° C. for 5 hours under a nitrogen stream. The resulting polymer (crosslinked spherical fine particles) formed by radical polymerization was filtered and washed with water, followed by dehydration by azeotropic distillation with toluene. After removal of excess toluene by distillation, it was obtained that a 30% toluene dispersion. The thus obtained crosslinked spherical fine particles were found to have an average particle diameter of 25 μm, with about 90 vol % of them being in the range of 25±5 μm. They were also found to be soft, tough, and resilient.

Example 1-14

The vinyl group-containing compound capable of radical polymerization (V-2) obtained in Referential Example 2 was made into crosslinked spherical fine particles. In 100 parts of the solution of V-2 was dissolved 1 part of benzoyl peroxide (BPO). The resulting solution was mixed with 25 parts of 3.0% aqueous solution of polyvinyl alcohol (PVA-205, explained above). The resulting mixture was stirred using a homomixer at 3000 rpm for 5 minutes. Thus there was obtained an inverted phase (W/O type) dispersion. To this dispersion was added 124 parts of deionized water, followed by mixing with a homomixer at 3000 rpm for 5 minutes. This mixing step brought about phase inversion, giving rise to a normal phase (O/W type) dispersion. This normal phase dispersion underwent radical polymerization at 90° C. for 5 hours under a nitrogen stream in the same flask as used in Example 1- 9. The resulting polymer (crosslinked spherical fine particles) formed by radical polymerization was filtered and washed with water, followed by drying at 60° C. for 24 hours. The thus obtained crosslinked spherical fine particles (in powder form) were found to have an average particle diameter of 15 μm, with about 88 vol % of them being in the range of 15±3 μm. They were also found to be hard, tough, and resilient.

Example 1-15

The vinyl group-containing compound capable of radical polymerization (V-1) obtained in Referential Example 1 was made into crosslinked spherical fine particles. In 100 parts of the solution of V-1 was dissolved 1 part of AIBN. The resulting solution was mixed with 18 parts of 1.0% aqueous solution of anionic surface active agent ("Hitenol N-08" made by Dai-ichi Kogyo Seiyaku Co., Ltd.). The resulting mixture was stirred using a paddle-type stirrer at 500 rpm for 30 minutes in the same flask as used in Example 1-9. Thus it was obtained that an inverted phase (W/O type) dispersion. To this dispersion was added dropwise 131 parts of 1.0% aqueous solution of polyvinyl alcohol (PVA-205, explained above) from the dropping funnel, with stirring at 500 rpm over 30 minutes. This mixing step brought about phase inversion, giving rise to a normal phase (O/W type) dispersion. This normal phase dispersion underwent radical polymerization at 70° C. for 5 hours under a nitrogen stream. The resulting polymer (crosslinked spherical fine particles) formed by radical polymerization was filtered off and washed with water, followed by dehydration by azeotropic distillation with toluene. After removal of excess toluene by distillation, a 35% toluene dispersion was obtained. The thus obtained crosslinked spherical fine particles were found to have an average particle diameter of 24 μm, with about 87 vol % of them being in the range of 24±5 μm. They were also found to be soft, tough, and resilient.

Example 1-16

The vinyl group-containing compound capable of radical polymerization (V-2) obtained in Referential Example 2 was made into crosslinked spherical fine particles. In 100 parts of the solution of V-2 was dissolved 1 part of AIBN. The resulting solution was mixed with 4 parts of 1.0% aqueous solution of polyvinyl alcohol (VA-205, explained above). The resulting mixture was stirred using a paddle-type stirrer at 500 rpm for 30 minutes in the same flask as used in Example 1-9. Thus an inverted phase (W/O type) dispersion was obtained. To this dispersion was added dropwise 145 parts of 1.0% aqueous solution of polyvinyl alcohol (PVA-205, explained above) from the dropping funnel, with stirring at 500 rpm over 30 minutes. This mixing step did not bring about complete phase inversion as in Example 1-13, but formed a mixture of non-spherical fine particles, 50 to hundreds μm in diameter, and crosslinked spherical fine particles of W/O/W-type, 200–1000 μm in diameter, (with oil droplets containing water droplets dispersed in water). Although these particles were extremely uneven in particle size distribution, they were found to be soft, tough, and resilient enough.

Example 1-17

The same procedure as in Example 1-13 was repeated to give a toluene dispersion containing 30% solids, except that the solution of the vinyl group-containing compound capable of radical polymerization (V-1) used for the production of crosslinked spherical fine particles was replaced by the solution of the vinyl group-containing compound capable of radical polymerization (V-3) obtained in Referential Example 3. The resulting crosslinked apherical fine particles were found to have an average particle diameter of 25 μm, with about 87 vol % of them being in the range of 25±5 μm. They were also found to be tough and resilient.

Example 1-18

The same procedure as in Example 1-15 was repeated to give a toluene dispersion containing 35% solids, except that the solution of the vinyl group-containing compound capable of radical polymerization (V-1) used for the production of crosslinked spherical fine particles was replaced by the solution of the vinyl group-containing compound capable of radical polymerization (V-4) obtained Referential Example 4. The resulting crosslinked spherical fine particles were found to have an average particle diameter of 20 μm, with about 90 vol % of them being in the range of 20±5 μm. They were also found to be tough and resilient.

Example 1-19

The same procedure as in Example 1-15 was repeated to give a toluene dispersion containing 30% solids, except that the solution of the vinyl group-containing compound capable of radical polymerization (V-1) used for the production of crosslinked spherical fine particles was replaced by the solution of the vinyl group-containing compound capable of radical polymerization (V-5) obtained in Referential Example 5 and the concentration of the anionic surface active agent ("Hitenol N-08" made by Dai-ichi Kogyo Seiyaku Co., Ltd.) was changed 6.0%. The resulting crosslinked spherical fine particles were found to have an average particle diameter of 6 μm, with about 87 vol % of them being in the range of 6±1 μm. They were also found to be tough and resilient.

Example 1-20

The same procedure as in Example 1-19 was repeated to give a toluene dispersion containing 30% solids, except that the solution of the vinyl group-containing compound capable of radical polymerization (V-5) used for the production of crosslinked spherical fine particles was replaced by the solution of the vinyl group-containing compound capable of radical polymerization (V-1a) obtained Referential Example 6. The resulting crosslinked spherical fine particles were found to have an average particle diameter of 7 μm, with about 82 vol % of them being in the range of 7±2 μm. They were also found to be soft, tough, and resilient.

Example 1-21

The same procedure as in Example 1-14 was repeated to give crosslinked spherical fine particles, except that the solution of the vinyl group-containing compound capable of radical polymerization (V-2) used for the production of crosslinked spherical fine particles was replaced by the solution of the vinyl group-containing compound capable of radical polymerization (V-2a) obtained in Referential Example 7. The resulting crosslinked spherical fine particles were found to have an average particle diameter of 9 μm, with about 87 vol % of them being in the range of 9±3 μm. They were also found to be soft, tough, and resilient.

Example 1-22

The same procedure as in Example 1-14 was repeated to give crosslinked spherical fine particles, except that the solution of the vinyl group-containing compound capable of radical polymerization (V-2) used for the production of crosslinked spherical fine particles was replaced by the carbon black-containing solution of the vinyl group-containing compound capable of radical polymerization (V-3) used in Example 1-10. The resulting black crosslinked spherical fine particles were found to have an average particle diameter of 27 μm, with about 80 vol % of them being in the range of 27±5 μm. They were also found to be tough and resilient.

Example 1-23

The same procedure as in Example 1-14 was repeated to give crosslinked spherical fine particles, except that the solution of the vinyl group-containing compound capable of radical polymerization (V-2) used for the production of crosslinked spherical fine particles was replaced by the titanium oxide-containing solution of the vinyl group-containing compound capable of radical polymerization (V-3) used in Example 1-11. The resulting white crosslinked spherical fine particles were found to have an average particle diameter of 20 μm, with about 83 vol % of them being in the range of 20±4 μm. They were also found to be tough and resilient.

Example 1-24

The vinyl group-containing compound capable of radical polymerization (V-1) obtained in Referential Example 1 was made into crosslinked spherical fine particles. In 100 parts of the solution of V-1 was dissolved 1 part of AIBN. The resulting solution was mixed with 18 parts of 0.5% aqueous solution of anionic surface active agent ("Hitenol N-08" made by Dai-ichi Kogyo Seiyaku Co., Ltd.). The resulting mixture was stirred using a paddle-type stirrer at 500 rpm for 30 minutes in the same flask as used in Example 1-9. Thus an inverted phase (W/O type) dispersion was obtained. To this dispersion was added dropwise 131 parts of 1.0% aqueous solution of polyvinyl alcohol (PVA-205, explained above) from the dropping funnel, with stirring at 500 rpm over 30 minutes. This is mixing step brought about phase inversion, giving rise to a normal phase (O/W type) dispersion. This normal phase dispersion underwent radical polymerization at 70° C. for 5 hours under a nitrogen stream. After the removal of toluene and water from the reaction system, an aqueous dispersion containing 30% solids was obtained. The suiting crosslinked spherical fine particles were found to have an average particle diameter of 90 μm, with about 75 vol % of them being in the range of 90±10 μm. They were also found to be soft and tough.

Comparative Example 1c-1

(Production of comparative fine particles)

The same procedure as in Example 1-1 was repeated to give comparative fine particles in the form of dispersion in toluene, except that the vinyl group-containing compound capable of radical polymerization (V-1) was replaced by 95 parts of butyl acrylate and 5 parts of trimethylolopane trimethacrylate. The comparative fine particles were found to have an average particle diameter of 32 μm, with about 25 vol % of them being in the range of 32±5 μm and about 50 vol % of them being in the range of 32±10 μm. They were also found to be soft but brittle.

Comparative Example 1c-2

(Production of comparative fine particles)

The same procedure as in Example 1-1 was repeated to give comparative fine particles, except that the vinyl group-containing compound capable of radical polymerization (V-3) was replaced by 95 parts of methyl methacrylate and 5 parts of trimethylolpropane trimethacrylate. The comparative fine particles were found to have an average particle diameter of 25 μm, with about 30 vol % of them being in the range of 25±5 μm and about 55 vol % of them being in the range of 25±10 μm. They were also found to hard but very brittle and lacked resilience.

Comparative Example 1c-3

(Production of comparative fine particles)

The following three components were mixed using a homomixer at 400 rpm for 5 minutes. (1) 60 parts of "Aroplats OB-6042" (polyester polyol obtained in Production Example 1) as the polyol component. (2) 40 parts of polyfunctional isocyanate ("Sumidule N" made by Sumitomo Bayer Urethane Co., Ltd.). (3) A solution formed by dissolving 20 parts of oil-modified urethane resin ("Arotan 193" made by Nippon Shokubai Kagaku Kogyo Co., Ltd.) in 880 parts of cyclohexane. The resulting mixture was placed in the same flask as used in Example 1-1 and underwent reaction at 80° C. for 5 hours under a nitrogen stream. After the removal of excess cyclohexane, a cyclohexane dispersion containing 30% solids was obtained. The resulting crosslinked spherical fine particles were found to have an average particle diameter of 25 μm, with about 10 vol % of them being in the range of 25±5 μm. They were also found to be tough but poor in resilience.

Comparative Example 1c-4

(Production of comparative fine particles)

The following four components were mixed using a homomixer at 400 rpm for 5 minutes. (1) 75 parts of "P-2000" polypropylene glycol (made by Asahi Denka Kogyo Co., Ltd.) as the polyol component. (2) 20 parts of methylene-bis-(4-cyclohexylisocyanate) as the isocyanate component. (3) 5 parts of 1,5-pentanediol as the glycol component. (4) A solution formed by dissolving 50 parts of "Leodol SP-L10" dispersing agent (made by Kao Co., Ltd.) in 880 parts of cyclohexane. The resulting mixture was placed in the same flask as used in Example 1-1 and underwent reaction at 80° C. for 5 hours under a nitrogen stream. After the removal of excess cyclohexane, it was obtained that a cyclohexane dispersion containing 30% solids. This dispersion was so unstable that the agglomererion of particles took place after standing for 3 days. The resulting crosslinked spherical fine particles were found, immediately after production, to have an average particle diameter of 27 μm, with about 10 vol % of them being in the range of 27±5 μm. They were also found to be poor in resilience.

Comparative Example 1c-5

(Production of comparative fine particles)

The following four components were mixed using a homomixer at 400 rpm for 5 minutes. (1) 48 parts of "Aroplats OB-6042" (polyester polyol obtained in Production Example 1) as the polyol component. (2) 32 parts of polyfunctional isocyanate ("Sumidule N" made by Sumitomo Bayer Urethane Co., Ltd.). (3) 20 parts of methyl methacrylate. (4) A solution formed by dissolving 20 parts of oil-modified urethane resin ("Arotan 193" made by Nippon Shokubai Kagaku Kogyo Co., Ltd.) in 880 parts of cyclohexane. The resulting mixture was placed in the same flask as used in Example 1-1 and underwent reaction at 80° C. for 5 hours under a nitrogen stream. After the removal of excess cyclohexane, it was obtained that a cyclohexane dispersion containing 30% solids. The resulting crosslinked spherical fine particles were found to have an average particle diameter of 28 μm, with about 10 vol % of them being in the range of 28±5 μm. They were also found to be poor in toughness and resilience.

Comparative Example 1c-6

(Production of comparative fine particles)

The following four components were mixed using a homomixer at 400 rpm for 5 minutes. (1) 60 parts of "Aroplats OB-6042" (polyester polyol obtained in Production Example (1) as the polyol component. (2) 30 parts of polyfunctional isocyanate ("Sumidule N" made by Sumitomo Bayer Urethane Co., Ltd.). (3) 10 parts of hydroxyethyl acrylate. (4) A solution formed by dissolving 20 parts of oil-modified urethane resin ("Arotan 193" made by Nippon Shokubai Kagaku Kogyo Co., Ltd.) in 880 parts of cyclohexane. The resulting mixture was placed in the same flask as used in Example 1-1 and underwent reaction at 80° C. for 5 hours under a nitrogen stream. After the removal of excess cyclohexane, it was obtained that a cyclohexane dispersion containing 30% solids. The resulting crosslinked spherical fine particles were found to have an average particle diameter of 25 μm, with about 10 vol % of them being in the range of 25±5 μm. They were also found to be tough but poor in resilience.

Example 2

(Production of coating composition)

Example 2-1

The crosslinked spherical fine particles obtained in Example 1-1 were thoroughly mixed with a binder resin specified below so that they account for 50% in the nonvolatile matter. The resulting mixture was diluted with a thinner (1:1 mixture of toluene and butyl acetate) to such an extent that it has a viscosity suitable for air spraying. Thus it was obtained that the coating composition (1) pertaining to the present invention. The coating composition (1) was applied by air spraying to a zinc phosphate treated plate, followed by forced drying at 60° C. for 30 minutes. The coated plate was tested for performance.

The binder resin was prepared by mixing the following three components in a ratio of 9:1:1 by weight.

Component I: Polyester resin ("Aroplats OB-59" with 50% non-volatile matter, made by Nippon Shokubai Kagaku Kogyo Co., Ltd.) containing 20% of titanium oxide ("Taipaque CR-95" made by Ishihara Sangyo Kaisha, Ltd.) dispersed by using a sand mill.

Component II: Polyester resin (same as above) containing 3 wt % of carbon black ("MA-100" made by Mitsubishi Chemical Industries, Ltd.) dispersed by using a sand mill.

Component III: Polyfunctional isocyanate ("Sumidule N" made by Sumitomo Bayer Urethane Co., Ltd.).

Examples 2-2 and 2-3

The same procedure as in Example 2-1 was repeated to give the coating compositions (2) and (3) and their test pieces, except that the crosslinked spherical fine particles were replaced by those obtained in Examples 1-2 and 1-8, respectively.

Example 2-4

The crosslinked spherical fine particles obtained in Example 1-10 were thoroughly mixed with a binder resin specified below so that they account for 50% in the nonvolatile matter. The resulting mixture was diluted in the same manner as in Example 2-1 to give the coating composition (4). A test piece with the coating composition (4) was also prepared.

The binder resin was prepared by mixing the following two components in a ratio of 10:1 by weight.

Component I: Polyester resin (same as above) containing 3% of carbon black ("MA-100" made by Mitsubishi Chemical Industries, Ltd.) dispersed by using a sand mill.

Component II: Polyfunctional isocyanate ("Sumidule N" made by Sumitomo Bayer Urethane Co., Ltd.).

Example 2-5

The crosslinked spherical fine particles obtained in Example 1-9 were thoroughly mixed with a binder resin specified below so that they account for 40% in the nonvolatile matter. The resulting mixture was diluted with water to such an extent that it has a viscosity suitable for air spraying. Thus it was obtained that the coating composition (5) pertaining to the present invention. The coating composition (5) was applied by air spraying to a gypsum board, followed by forced drying at 60° C. for 30 minutes. The coated board was tested for performance.

The binder resin was prepared by mixing the following two components in such a ratio as to give a pigment content of 30%.

Component I: Acrylic emulsion ("Acriset 210E" with 50% nonvolatile matter, made by Nippon Shokubai Kagaku Kogyo Co., Ltd.).

Component II: Titanium oxide paste (composed of 100 parts of titanium oxide ("Taipaque CR-95", explained above) and 5 parts of ethylene glycol.

Example 2-6

The crosslinked spherical fine particles obtained in Example 1-1 were thoroughly mixed with a binder resin specified below so that they account for 75% in the nonvolatile matter. The resulting mixture was diluted in the same manner as in Example 2-1 to give the coating composition (6). A test piece with the coating composition (6) was also prepared.

The binder resin was prepared by mixing the following three components in a ratio of 9:1:1 by weight.

Component I: Acryl polyol ("Arotan 2072" with 50% nonvolatile matter, made by Nippon Shokubai Kagaku Kogyo Co., Ltd.) containing 40% of titanium oxide ("Taipaque CR-95" made by Ishihara Sangyo Kaisha, Ltd.) dispersed by using a sand mill.

Component II: Acryl polyol (same as above) containing 3% of carbon black ("MA-100" made by Mitsubishi Chemical Industries, Ltd.) dispersed by using a sand mill.

Component III: Polyfunctional isocyanate ("Sumidule N" made by Sumitomo Bayer Urethane Co., Ltd.).

Example 2-7

The crosslinked spherical fine particles obtained in Example 1-2 were thoroughly mixed with a binder resin specified below so that they account for 40% in the nonvolatile matter. The resulting mixture was diluted with a thinner (1:1 mixture of toluene and butyl alcohol) to such an extent that it has a viscosity suitable for air spraying. Thus it was obtained that the coating composition (7) pertaining to the present invention. The coating composition (7) was applied by air spraying to a zinc phosphate treated plate, followed by forced drying at 150° C. for 30 minutes. The coated plate was tested for performance.

The binder resin was prepared by mixing the following three components in a ratio of 9:1:1 by weight.

Component I: Silicone-modified polyester resin ("Aroplats 1713" with 60% nonvolatile matter, made by Nippon Shokubai Kagaku Kogyo Co., Ltd.) containing 20% of titanium oxide ("Taipaque CR-95" made by Ishihara Sangyo Kaisha, Ltd.) dispersed by using a sand mill.

Component II: Silicone-modified polyester resin (same as above) containing 3% of carbon black ("MA-100" made by Mitsubishi Chemical Industries, Ltd.) dispersed by using a sand mill.

Component III: Melamine resin ("Superbekkamine 47-508" made by Dainippon Ink & Chemicals Inc.).

Example 2-8

The crosslinked spherical fine particles obtained in Example 1-1 were thoroughly mixed with a binder resin specified below so that they account for 10% in the nonvolatile matter. The resulting mixture was diluted with a thinner (1:1 mixture of toluene and ethyl acetate) to such an extent that it has a viscosity suitable for air spraying. Thus it was obtained that the coating composition (8) pertaining to the present invention. The coating composition (8) was applied by air spraying to a polystyrene board, followed by forced drying at 60° C. for 30 minutes. The coated plate was tested for performance.

The binder resin was prepared by mixing the following two components in a ratio of 9:1 by weight.

Component I: Acrylic resin ("Aroset 5227" with 45% nonvolatile matter, made by Nippon Shokubai Kagaku Kogyo Co., Ltd.) containing 20% of titanium oxide ("Taipaque CR-95" made by Ishihara Sangyo Kaisha, Ltd.) dispersed by using a sand mill.

Component II: Acrylic resin (same as above) containing 3% of carbon black (same as above) dispersed by using a sand mill.

Example 2-9

The crosslinked spherical fine particles obtained in Example 1-1 were thoroughly mixed with a binder resin specified below so that they account for 60% in the nonvolatile matter. The resulting mixture was diluted in the same manner as in Example 2-1 to give the coating composition (9) pertaining to the present invention. A test piece with the coating composition (9) was also prepared.

The binder resin was prepared by mixing the following two components in a ratio of 1:1 by weight.

Component I: Polyester resin ("Aroflint 404" with 60% nonvolatile matter, made by Nippon Shokubai Kagaku Kogyo Co., Ltd.) containing 40% of titanium oxide (same as above) dispersed by using a sand mill.

Component II: Epoxy resin ("Aroflint 606" with 100% nonvolatile matter, made by Nippon Shokubai Kagaku Kogyo Co., Ltd.) containing 1% of carbon black (same as above) dispersed by using a sand mill.

Example 2-10

The same procedure as in Example 2-2 was repeated to give the coating composition (10) and its test piece, except that the crosslinked spherical fine particles were added such that they account for 1.0% in the nonvolatile matter.

Example 2-11

The same procedure as in Example 2-2 was repeated to give the coating composition (11) and its test piece, except that the crosslinked spherical fine particles were added such that they account for 85% in the nonvolatile matter.

Example 2-12

The crosslinked spherical fine particles obtained in Example 1-1 were thoroughly mixed with a binder resin specified below so that they account for 75% in the nonvolatile matter. The resulting mixture was diluted in the same manner as in Example 2-1 to give the coating composition (12) which forms a clear coating film after drying. A test piece with the coating composition (12) was also prepared.

The binder resin was prepared from the following two components.

Component I: 90 parts of acryl polyol ("Arotan 2072" with 50% nonvolatile matter, made by Nippon Shokubai Kagaku Kogyo Co., Ltd.).

Component II: 10 parts of polyfunctional isocyanate ("Sumidule N" made by Sumitomo Bayer Urethane Co., Ltd.).

Examples 2-13 to 2-23

The crosslinked spherical fine particles obtained in Examples 1-13 to 1-23 were formed into coating compositions (13) to (23) according to the respective procedures used in the examples shown in Table 2.

Example 2-24

The crosslinked spherical fine particles obtained in Example 1-1 and the crosslinked spherical fine particles obtained in Example 1-10 were mixed in a ratio of 1:1 (by weight). The resulting mixture was thoroughly mixed with a binder resin specified below so that the spherical fine particles account for 50% in the nonvolatile matter. The resulting mixture was diluted with a thinner (1:1 mixture of toluene and butyl acetate) to such an extent that it has a viscosity suitable for air spraying. Thus it was obtained that the coating composition (24) pertaining to the present invention.

The binder resin was prepared by mixing the following two components in a ratio of 10:1 by weight.

Component I: Polyester resin ("Aroplats OB-59" with 50% nonvolatile matter, made by Nippon Shokubai Kagaku Kogyo Co., Ltd.) containing 3% of carbon black ("MA-100" made by Mitsubishi Chemical Industries, Ltd.) dispersed by using a sand mill.

Component II: Polyfunctional isocyanate ("Sumidule N" made by Sumitomo Bayer Urethane Co., Ltd.). The content of spherical fine particles in each coating composition, the kind of substrate, and the drying condition are also shown in Table 2.

Comparative Examples 2c-1 and 2c-2

(Production of comparative coating compositions)

The same procedure as in Example 2-1 was repeated to give the comparative coating compositions (1c) and (2c), except that the crosslinked spherical fine particles obtained in Example 1-1 were replaced by those obtained in Comparative Examples (1c-1) and (1c-2), respectively. Their test pieces were also prepared.

Comparative Example 2c-3

(Production of comparative coating compositions)

The same procedure as in Example 2-1 was repeated to give the comparative coating composition (3c), except that the crosslinked spherical fine particles were not added. Its test piece was also prepared.

Comparative Examples 2c-4 to 2c-7

(Production of comparative coating compositions)

The same procedure as in Example 2-1 was repeated to give the comparative coating compositions (4c), (5c), (6c), and (7c), comparative examples (2c-4)–(2c-7), respectively, except that the crosslinked spherical fine particles obtained in Example 1-1 were replaced by those obtained in Comparative Examples (1c-3) to (1c-6), respectively. Their test pieces were also prepared. The coating substrates and drying conditions are shown in Table 2.

Fair: Slight change in appearance.
Poor: Slight damage in the coating film by blistering, cracking, peeling, hole, softening, or dissolution.
Bad: Severe damage in the coating film by blistering, cracking, peeling, hole, softening, or dissolution.

(5) Alkali resistance: According to JIS K5400. (0.1N NaOH aqueous solution, at 25° C. for 7 days)
Good: No change in the coating film.
Fair: Slight change in appearance.
Poor: Slight damage in the coating film by blistering, cracking, peeling, hole, softening, or dissolution.

TABLE 2

| Example No. (Comparative Example No.) | Example No. pertaining to procedure employed | Example No. pertaining to fine particles used | Content of fine particles in non-volatile matter in coating composition | Substrate for coating | Drying conditions °C. × min | Designation of coating composition |
|---|---|---|---|---|---|---|
| 2-13 | 2-1 | 1-13 | 50% | Phosphated plate | 60 × 30 | (13) |
| 2-14 | 2-1 | 1-15 | 50% | Phosphated plate | " | (14) |
| 2-15 | 2-6 | 1-17 | 75% | Phosphated plate | " | (15) |
| 2-16 | 2-7 | 1-18 | 40% | Phosphated plate | 150 × 30 | (16) |
| 2-17 | 2-8 | 1-19 | 10% | Polystyrene plate | 60 × 30 | (17) |
| 2-18 | 2-12 | 1-20 | 50% | Phosphated plate | " | (18) |
| 2-19 | 2-3 | 1-21 | 50% | Phosphated plate | " | (19) |
| 2-20 | 2-4 | 1-22 | 50% | Phosphated plate | " | (20) |
| 2-21 | 2-4 | 1-11 | 50% | Phosphated plate | " | (21) |
| 2-22 | 2-4 | 1-23 | 50% | Phosphated plate | " | (22) |
| 2-23 | 2-5 | 1-24 | 40% | Gypsum board | " | (23) |
| 2-24 | — | 1-1/1-10 (= 1/1) | 50% | Phosphated plate | " | (24) |
| (2c-4) | 2-1 | 1c-3 | 50% | Phosphated plate | " | Comparative (4) |
| (2c-5) | 2-1 | 1c-4 | 50% | Phosphated plate | " | Comparative (5) |
| (2c-6) | 2-1 | 1c-5 | 50% | Phosphated plate | " | Comparative (6) |
| (2c-7) | 2-1 | 1c-6 | 50% | Phosphated plate | " | Comparative (7) |

That test pieces obtained in Examples 2-1 to 2-23 and Comparative Examples 2c-1 to 2c-7 were evaluated according to the following test methods. The results are shown in Table 3.

(1) Finish (visual inspection of coating film)
Excellent: Suedelike or leatherlike with completely uniform gloss and glare properties.
Good: Suedelike or leatherlike feel with uniform gloss.
Fair: Suedelike or leatherlike feel with slightly uneven gloss.
Poor: Poor in suedelike or leatherlike feel with slightly uneven gloss.
Bad: Lacking in suedelike or leatherlike feel.

(2) Touch of coating film: Finger touch (3) Pencil hardness: According to JIS K5400. Expressed in terms of the hardness of a pencil which is hardest but does not scratch the coating film.

(4) Acid resistance: According to JIS K5400. (0.1N $H_2SO_4$ aqueous solution, at 25° C. for 7 days)
Good: No change in the coating film.
Bad: Severe damage in the coating film by blistering, cracking, peeling, hole, softening, or dissolution.

(6) Solvent resistance: Evaluated by observing what happens when one drop of solvent is placed on the coating film at 25° C. and then allowed to evaporate.
Good: No change in the coating film.
Fair: Slight change in appearance.
Poor: Slight blistering, cracking, peeling, hole, softening, or dissolution.
Bad: Severe blistering, cracking, peeling, hole, softening, or dissolution.

(7) Water resistance: According to JIS K5400. (at 50° C. for 7 days)
Good: No change in the coating film.
Fair: Slight change in appearance.
Poor: Slight blistering, cracking, peeling, hole, softening, or dissolution.
Bad: Severe blistering, cracking, peeling, hole, softening, or dissolution.

(8) Weathering: According to JIS K5400. Expressed in terms of time (at intervals of 500 hours) required for the coating film to change in appearance. (Decrease in gloss by 10%, change in color difference by 5, and/or damage such as swelling, peeling, hole, and softening.)

TABLE 3

| | Example No. | | | | | | | | | | |
|---|---|---|---|---|---|---|---|---|---|---|---|
| | 2-1 | 2-2 | 2-3 | 2-4 | 2-5 | 2-6 | 2-7 | 2-8 | 2-9 | 2-10 | 2-11 |
| Coating composition | (1) | (2) | (3) | (4) | (5) | (6) | (7) | (8) | (9) | (10) | (11) |
| Finish | Good | Good | Good | Good | Fair | Good | Good | Good | Good | Fair | Good |
| Feel of coating film | Soft, leather-like | Soft, leather-like | Slightly hard, leather-like | Soft, leather-like | Soft, leather-like | Soft, leather-like | Slightly hard, leather-like | Slightly hard, leather-like | Slightly hard, leather-like | Soft, leather-like | Soft, leather-like |
| Pencil hardness | 2H | 2H | 2H | 2H | HB | 2H | 2H | H | H | B | 2B |
| Acid resistance | Good | Good | Good | Good | Good | Good | Good | Good | Good | Good | Good |
| Alkali resistance | Good | Good | Good | Good | Good | Good | Good | Good | Good | Good | Good |
| Solvent resistance | | | | | | | | | | | |
| Methanol | Good | Good | Good | Good | Good | Good | Good | Good | Good | Good | Good |
| Xylene | Good | Good | Good | Good | Bad | Good | Good | Bad | Good | Poor | Good |
| Water resistance | Good | Good | Good | Good | Fair | Good | Good | Good | Good | Good | — |
| Weathering (Hr) | 2000 | 2000 | 2000 | 2000 | 2000 | 3000 | 2500 | 1500 | 2000 | 2000 | 2000 |

| | Example No. | | | | | | | | | | |
|---|---|---|---|---|---|---|---|---|---|---|---|
| | 2-12 | 2-13 | 2-14 | 2-15 | 2-16 | 2-17 | 2-18 | 2-19 | 2-20 | 2-21 | 2-22 |
| Coating composition | (12) | (13) | (14) | (15) | (16) | (17) | (18) | (19) | (20) | (21) | (22) |
| Finish | Good | Excel | Excel | Excel | Excel | Good | Excel | Excel | Excel | Good | Excel |
| Feel of coating film | Soft, leather-like | Very soft, leather-like | Very soft, leather-like | Very soft, leather-like | Slightly hard, leather-like | Slightly hard, leather-like | Soft, leather-like | Slightly hard, leather-like | Very Soft leather-like | Soft, leather-like | Very soft, leather-like |
| Pencil hardness | HB | 2H | 2H | 2H | 2H | H | HB | 2H | 2H | 2H | 2H |
| Acid resistance | Good | Good | Good | Good | Good | Good | Good | Good | Good | Good | Good |
| Alkali resistance | Good | Good | Good | Good | Good | Good | Good | Good | Good | Good | Good |
| Solvent resistance | | | | | | | | | | | |
| Methanol | Good | Good | Good | Good | Good | Good | Good | Good | Good | Good | Good |
| Xylene | Good | Good | Good | Good | Good | Bad | Good | Good | Good | Good | Good |
| Water resistance | Good | Good | Good | Good | Good | Good | Good | Good | Good | Good | Good |
| Weathering (Hr) | 2500 | 2000 | 2000 | 3000 | 2500 | 1500 | 2500 | 2000 | 2000 | 2000 | 2000 |

| | Example No. | | Comparative Example No. | | | | | | |
|---|---|---|---|---|---|---|---|---|---|
| | 2-23 | 2-24 | 2c-1 | 2c-2 | 2c-3 | 2c-4 | 2c-5 | 2c-6 | 2c-7 |
| Coating composition | (23) | (24) | Comp (1) | Comp (2) | Comp (3) | Comp (4) | Comp (5) | Comp (6) | Comp (7) |
| Finish | Good | Good | Good | Good | Bad | Good | Fair | Fair | Fair |
| Feel of coating film | Soft, leather-like | Slightly hard, leather-like | Soft, leather-like | Hard, not leather-like | Soft, not leather-like | Slightly hard, not leather-like | Soft, leather-like | Slightly hard, not leather-like | Slightly hard leather-like |
| Pencil hardness | HB | 2H | 2B | 2H | HB | B | 2B | HB | B |
| Acid resistance | Good | Good | Poor | Good | Good | Fair | Bad | Fair | Fair |
| Alkali resistance | Good | Good | Poor | Good | Good | Poor | Bad | Poor | Fair |
| Solvent resistance | | | | | | | | | |
| Methanol | Good | Good | Good | Good | Good | Good | Bad | Good | Good |
| Xylene | Bad | Good | Bad | Poor | Good | Fair | Bad | Fair | Fair |
| Water resistance | Fair | Good | Poor | Fair | Good | Food | Bad | Fair | Fair |
| Weathering (Hr) | 2000 | 2500 | 1000 | 1500 | 2000 | 500 | 250 | 500 | 500 |

Example 3 (Production of filmlike articles)

Example 3-1

The coating composition (1) obtained in Example 2-1 mentioned above was applied onto a sheet of release paper by the air spray method so that the dry coating thickness was 50 μm. After forced drying at 60° C. for 30 minutes, the coating layer was peeled off from the release paper to give a filmlike article (F-1).

This filmlike article (F-1) had a high-quality appearance and a natural leatherlike feel. In addition, it was superior in chemical resistance, solvent resistance, water resistance, durability, and flexibility.

Examples 3-2 to 3-10

The same procedure as in Example 3-1 was repeated except that the coating composition (1) was replaced by the coating compositions (2), (3), (4), (10), (21), (13), (19), (20), and (22) which were obtained in Examples 2-2, 2-3, 2-4, 2-10, 2-21, 2-13, 2-19, 2-20, and 2-22, respectively. Thus filmlike articles (F-2) to (F-10), which all had a high-quality appearance and a natural leatherlike or velvetlike feel and also had good chemical resistance, solvent resistance, water resistance, durability, and flexibility were obtained. The filmlike articles (F-7) to (F-10) were particularly superior in appearance and feel and had non-glare properties.

Example 3-11

The coating composition (16) obtained in Example 2-16 mentioned above was applied onto a teflon sheet by the air spray method so that the dry coating thickness was 50 μm. After forced drying at 150° C. for 30 minutes, the coating layer was peeled off from the teflon sheet to give a filmlike article (F-11).

This filmlike article (F-11) had a high-quality appearance and a natural leatherlike feel. In addition, it was superior in chemical resistance, solvent resistance, water resistance, durability, and flexibility.

Example 4 (Production of sheetlike article)

Example 4-1

The coating composition (1) obtained in Example 2-1 mentioned above was applied onto one side of a 40-μm thick polyester film by the air spray method so that the dry coating thickness was 40 μm. After forced drying at 60° C. for 30 minutes, a sheetlike article (S-1) was obtained.

This sheetlike article (S-1) had a high-quality appearance and a natural leatherlike feel. In addition, it was superior in chemical resistance, solvent resistance, water resistance, durability, and flexibility.

Examples 4-2 to 4-10

The same procedure as in Example 4-1 was repeated except that the coating composition (1) was replaced by the coating compositions (2), (3), (4), (10), (21), (13), (19), (20), and (22) which were obtained in Examples 2-2, 2-3, 2-4, 2-10, 2-21, 2-13, 2-19, 2-20, and 2-22, respectively. Thus there were obtained sheetlike articles (S-2) to (S-10), which all had a high-quality appearance and a natural leatherlike or velvetlike feel and also had good chemical resistance, solvent resistance, water resistance, durability, and flexibility. The sheetlike articles (S-7) to (S-10) were particularly superior in appearance and feel and had non-glare properties.

Examples 4-11 and 4-12

The coating compositions (12) and (18) obtained in Examples 2-12 and 2-18, respectively, were applied onto one side of a 50-μm thickness flexible polyvinyl chloride sheet colored in beige, so that the dry coating thickness was 40 μm. After forced drying at 60° C. for 30 minutes, sheetlike articles (S-11) and (S-12) were obtained.

The sheetlike article (S-11) had a high-quality appearance of natural leather assuming a beige color of the polyvinyl chloride sheet. The sheetlike article (S-12) was superior particularly in appearance and feel and had non-glare properties. In addition, it was superior in chemical resistance, solvent resistance, water resistance, and durability.

Examples 4-13 to 4-19

The same procedure as in Example 4-1 was repeated except that the polyester film was replaced by a 60-μm thickness flexible polyvinyl chloride sheet and the coating compositions (1), (3), (4), (6), (13), (19), and (20) obtained in Examples 2-1, 2-3, 2-4, 2-6, 2-13, 2-19, and 2-20, respectively, were used. Thus sheetlike articles (S-13) to (S-19) were obtained. The sheetlike articles (S-13) to (S-16) all had a high-quality appearance and a natural leatherlike or velvetlike feel. The sheetlike articles (S-17) to (S-19) were particularly superior in appearance and feel and had non-glare properties. In addition, they were superior in chemical resistance, solvent resistance, water resistance, durability, and flexibility.

Examples 4-20 to 4-25

Each of the coating compositions (1), (3), (4), (13), (19), and (20) obtained in Examples 2-1, 2-3, 2-4, 2-13, 2-19, and 2-20, respectively, was applied onto one side of a 5-mm thick artificial leather of polyurethane, so that the dry coating thickness was 40 μm. After forced drying at 60° C. for 30 minutes, sheetlike articles (S-20) to (S-25) were obtained.

These sheetlike articles (S-20) to (S-25) had a better natural leatherlike appearance and feel than the conventional artificial leather, and they were superior in chemical resistance, solvent resistance, water resistance, and durability.

Examples 4-26 to 4-31

Each of the coating compositions (1), (3), (4), (13), (19), and (20) obtained in Examples 2-1, 2-3, 2-4, 2-13, 2-19, and 2-20, respectively, were applied onto one side of a 5-mm thickness natural leather (bovine leather), so that the dry coating thickness was 40 μm. After forced drying at 60° C. for 30 minutes, sheetlike articles (S-26) to (S-31) were obtained.

These sheetlike articles (S-26) to (S-31) had a high-quality appearance and feel in addition to the hand of natural leather, and they were superior in chemical resistance, solvent resistance, water resistance, and durability.

Examples 4-32 to 4-35

The same procedure as in Example 4-1 was repeated except that the polyester film was replaced by 40-μm thickness paper and the coating compositions (1), (3), (13), and (19) obtained in Examples 2-1, 2-3, 2-13, and 2-19, respectively, were used. Thus sheetlike articles (S-32) to (S-35) were obtained. The sheetlike articles (S-32) and (S-33) had a high-quality appearance and a natural leatherlike feel. The sheetlike articles (S-34) and (S-35) were particularly superior in appearance and feel and had non-glare properties. In addition, they were superior in chemical resistance, solvent resistance, water resistance, durability, and flexibility.

Examples 4-36 to 4-39

The same procedure as in Examples 4-32 to 4-35 was repeated except that the paper was replaced by a 50-μm thickness staple fiber cloth. Thus sheetlike articles (S-36) to (S-39) were obtained. The sheetlike articles (S-36) and (S-37) had a high-quality appearance and a natural leather-like feel. The sheetlike articles (S-38) and (S-39) were particularly superior in appearance and feel and had non-glare properties. In addition, they were superior in chemical resistance, solvent resistance, water resistance, durability, and flexibility.

Example 5 (Production of adhesive filmlike article)

Example 5-1

A remoistening adhesive of 20% aqueous solution of polyvinyl alcohol having a degree of saponification of about 88 mol % and a degree of polymerization of 500 was applied to the surface, from which the release paper had been removed, each of the filmlike articles (F-1) to (F-10) obtained in Examples 3-1 to 3-10, respectively, so that the dry coating thickness was about 35 μm. After drying at 80° C. for 10 minutes, adhesive filmlike articles (AF-1) to (AF-10) were obtained.

These adhesive filmlike articles (AF-1) to (AF-10) exhibit adhesion when the adhesive layer is moistened with water, so that they can be stuck to paper and wood easily.

Example 5-2

A pressure-sensitive adhesive composed of 100 parts of acrylic-based solution-type pressure-sensitive adhesive (*) and 1.1 parts of isocyanate crosslinking agent (**) was applied to a release paper so that the dry coating thickness was 40 μm. After drying at 80° C. for 2 minutes, the coating layer was pressed against the surface, from which the release paper had been removed, of each of the filmlike articles obtained in Examples 3-1 to 3-10. Thus release paper-backed adhesive filmlike articles (AF-11) to (AF-20) were obtained. They stick easily to a variety of objects when the release paper is removed and the pressure-sensitive adhesive layer is exposed.
* "Aroset 8025", containing 40% nonvolatile matter, made by Nippon Shokubai Kagaku Kogyo Co., Ltd.
** "Colonate L", made by Nippon Polyurethane Kogyo Co., Ltd.

Example 5-3

A hot-melt adhesive prepared by melt-mixing at 150° C. 40 parts of vinyl acetate resin containing 28% of vinyl acetate and having a melt index of 15, 40 parts of aromatic hydrogenated petroleum resin having a softening point of 100° C., and 20 parts of paraffin wax having a melting point of 140° F., was applied to the surface, from which the teflon sheet had been removed, of the filmlike article (F-11) obtained in Example 3-11, so that the hot-melt adhesive layer had a thickness of 40 μm. After cooling, an adhesive filmlike article (AF-21) was obtained. The hot-melt adhesive surface of the adhesive filmlike article (AF-21) stick easily to an adherend such as steel plate when heated at 130°–150° C. under pressure.

Example 6 (Production of adhesive sheetlike article)

Example 6-1

A pressure-sensitive adhesive with release paper was stuck, in the same manner as in Example 5-2, to the polyester film side of each of the sheetlike articles (S-1) to (S-10) obtained in Examples 4-1 to 4-10, to give release paper-backed adhesive sheetlike articles (AS-1) to (AS-10).

These adhesive sheetlike articles (AS-1) to (AS-10) stick easily to a variety of objects when the release paper is removed and the pressure-sensitive adhesive layer is exposed.

Example 6-2

A pressure-sensitive adhesive with release paper was stuck, in the same manner as in Example 5-2, to the opposite side of the coating film of the sheetlike articles (S-11) to (S-19) obtained in Examples (4-11) to (4-19) in which the substrate was flexible polyvinyl chloride sheet, to yield release paper-backed adhesive sheetlike articles (AS-11) to (AS-19).

These adhesive sheetlike articles (AS-11) to (AS-19) stick easily to a variety of objects when the release paper is removed and the pressure-sensitive adhesive layer is exposed.

Example 6-3

A pressure-sensitive adhesive with release paper was stuck, in the same manner as in Example 6-2, to yield release paper-backed adhesive sheetlike articles (AS-20) to (AS-25), except that the sheetlike articles (S-11) to (S-19) used in Example 6-2 were replaced by the sheetlike articles (S-20) to (S-25) of Examples (4-20) to (4-25) in which the substrate is an artificial leather sheet of polyurethane.

These adhesive sheetlike articles (AS-20) to (AS-25) stick easily to a variety of objects when the release paper is removed and the pressure-sensitive adhesive layer is exposed.

Example 6-4

A hot-melt adhesive was prepared by melt-mixing at 150° C. 40 parts of vinyl acetate resin containing 28% of vinyl acetate and having a melt index of 15, 40 parts of aromatic hydrogenated petroleum resin having a softening point of 100° C., and 20 parts of paraffin wax having a melting point of 40° F. This hot-melt adhesive was applied to the opposite side of the coating film of the sheetlike articles (S-26) to (S-31) in Examples (4-26) to (4-31) in which the substrate is natural leather, so that the hot-melt adhesive layer had a thickness of 40 μm. After cooling, adhesive sheetlike articles (AS-26) to (AS-31) were obtained. The hot-melt adhesive surface of these adhesive sheetlike articles (AS-26) to (AS-31) stick easily to an adherend such as steel plate when heated at 130°–150° C. under pressure.

Example 6-5

A remoistening adhesive of 20% aqueous solution of polyvinyl alcohol having a degree of saponification of about 88 mol % and a degree of polymerization of 500 was applied to the opposite side of the coating film of the sheetlike articles (S-32) to (S-35) in Examples (4-32) to (4-35), in which the substrate is paper, so that the remoistening adhesive layer had a thickness (dry) of 40 μm. After drying at 80° C. for 15 minutes, adhesive sheetlike articles (AS-32) to (AS-35) were obtained. These adhesive sheetlike articles (AS-32) to (AS-35) exhibit adhesion when the adhesive layer is moistened with water, so that they stick easily to paper and wood. Production Example 1 for pressure-sensitive adhesive component Referential Production Example 1: Composition containing an excessive amount of compound (D)

Referential Production Example 2: Composition containing compound (A) alone.

Referential Production Example 3: Composition containing an excessive amount of compound (B)

TABLE 4

| | | Production Examples | | | | Referential Production Examples | | |
|---|---|---|---|---|---|---|---|---|
| | Monomer | 2 | 3 | 4 | 5 | 1 | 2 | 3 |
| Compound (A) | Methyltriglycol acrylate | 120 | 100 | 100 | — | 50 | 100 | 100 |
| Compound (A) | 2-ethylhexyl acrylate | — | — | — | 905 | — | — | — |
| Compound (A) | Butyl acrylate | 839.5 | 842 | 790 | — | 678 | 900 | 750 |
| Compound (B) | 2-hydroxyethyl acrylate | — | 4 | — | — | 1 | — | 40 |
| Compound (B) | Placsel FM-1* | 0.5 | 4 | — | 10 | 1 | — | 40 |
| Compound (C) | Acrylic acid | 40 | — | 60 | 5 | 20 | — | 20 |
| Compound (D) | Ethyl acrylate | — | — | — | 80 | — | — | — |
| Compound (D) | Vinyl acrylate | — | 50 | 50 | — | 250 | — | 50 |

*Caprolactone-modified hydroxymethacrylate made by Daicel Chemical Industries Co., Ltd.

A 3-liter flask equipped with a thermometer, cooling condenser, nitrogen introducing tube, and stirrer was charged with 1500 parts of toluene, 100 parts of methyltriglycol acrylate, 826 parts of butyl acrylate, 2 parts of 2-hydroxyethyl acrylate, 2 parts of caprolactone-modified hydroxymethacrylate ("Placsel FM-1" made by Daicel Chemical Industries Co., Ltd.), 20 parts of acrylic acid, and 50 parts of vinyl acetate. The reactants were heated to 80° C. with stirring under a nitrogen stream. Then, 2 parts of benzoyl peroxide as a polymerization initiator was added. The reactants were stirred at that temperature for 2 hours. One part of benzoyl peroxide was further added and stirring was continued for two hours. Thus it was obtained that the pressure-sensitive adhesive component (1) containing 40% of nonvolatile matter.

Production Examples 2 to 5 for Pressure-Sensitive Adhesive Component

The same procedure as in Production Example 1 mentioned above was repeated to give pressure-sensitive adhesive components (2) to (5) each containing 40% of nonvolatile matter, except that the kind and amount of the monomers were changed as shown in Table 4.

Referential Production Examples 1 to 3 for Pressure-Sensitive Adhesive Component The same procedure as in Production Example 1 mentioned above was repeated to give referential pressure-sensitive adhesive components (c-1) to (c-3) each containing 40% of nonvolatile matter, except that the kind and amount of the monomers were changed as shown in Table 4.

Incidentally, Production Examples 1 to 5 show the monomer composition desirable for the pressure-sensitive adhesive components and Referential Production Examples 1 to 3 show the monomer composition which does not meet the requirements for the pressure-sensitive adhesive components.

Production Example 6 for Pressure-Sensitive Adhesive Component

A uniform solution was prepared by mixing 200 parts of butyl acrylate, 50 parts of ethyl acrylate, 30 parts of 2-hydroxyethyl methacrylate, 20 parts of methacrylic acid, and 10 parts of dehydrated benzoguanamine resin (initial condensate of methylol benzoguanamine, made by Nippon Shokubai Kagaku Kogyo Co., Ltd.) as a crosslinking agent. To this solution was added 700 parts of 2-ethylhexyl acrylate to give a monomer mixture. This monomer mixture was mixed with an aqueous solution of emulsifier prepared by dissolving 15 parts of "Hitenol N-08" (Emulsifier made by Dai-ichi Kogyo Seiyaku Co., Ltd.) in 285 parts of water. Thus an aqueous dispersion of monomers was obtained.

A 3-liter flask equipped with a thermometer, cooling condenser, nitrogen introducing tube, and stirrer was charged with 311 parts of deionized water. With the water heated to 75° C., the flask was charged further with 25 parts of 10% aqueous solution of ammonium persulfate and 5 parts of 5% aqueous solution of sodium bisulfite, while blowing nitrogen gas with stirring. One-tenth of the aqueous dispersion of monomers obtained as mentioned above was added rapidly. After the confirmation of the start of the polymerization reaction, the remainder (9/10) of the aqueous dispersion of monomers and 25 parts of 10% aqueous solution of ammonium persulfate and 45 parts of 5% aqueous solution of sodium bisulfite were added dropwise over 150 minutes. In this period, the temperature was kept at 75° C. and the polymerization of the monomer mixture was carried out. After the dropwise addition was completed, the temperature was raised to 80° C. and kept at 80° C. for 60 minutes. Thus it was obtained that an aqueous dispersion of copolymer containing 60% nonvolatile matter. This aqueous dispersion was adjusted to pH 7.5 with 25% ammonia water. Thus the emulsion type pressure-sensitive adhesive component (6) was obtained.

Example 7 (Production of Peelable Pressure-Sensitive Adhesive and Peelable Pressure-Sensitive Adhesive Article)

Example 7-1

A peelable pressure-sensitive adhesive composition was prepared by uniformly mixing 200 parts of crosslinked spherical fine particles (30% dispersion in toluene) obtained in Example 1-13, 100 parts of the pressure-sensitive adhesive component (1) obtained in Production Example 1 mentioned above, 3 parts (4.125% based on solids of the pressure-sensitive component) of isocyanate crosslinking agent ("Colonate L-55E" (55%) made by Nippon Polyurethane Kogyo Co., Ltd.), and 200 parts of toluene. The resulting peelable pressure-sensitive adhesive composition contains about 20% of nonvolatile matter, with the crosslinked spherical fine particles uniformly dispersed.

The composition was applied to one side of woodfree paper (70K) so that the dry coating weight was 10 g/m². After drying at 80° C. for 3 minutes and aging at 23° C. and 65% RH for 4 days, a peelable pressure-sensitive adhesive sheet was obtained.

Example 7-2

The same procedure as in Example 7-1 was repeated to yield a peelable pressure-sensitive adhesive composition and a peelable pressure-sensitive adhesive sheet, except that the pressure-sensitive adhesive component was replaced by the pressure-sensitive adhesive component (2) obtained in Production Example 2 mentioned above and the crosslinking agent was replaced by 1.2 parts (3% based on solids in the pressure-sensitive adhesive component) of butyl etherified melamine.

Example 7-3

The same procedure as in Example 7-1 was repeated to yield a peelable pressure-sensitive adhesive composition and a peelable pressure-sensitive adhesive sheet, except that the pressure-sensitive adhesive component was replaced by the pressure-sensitive adhesive component (3) obtained in Production Example 3 mentioned above.

Example 7-4

The same procedure as in Example 7-1 was repeated to yield a peelable pressure-sensitive adhesive composition and a peelable pressure-sensitive adhesive sheet, except that the pressure-sensitive adhesive component was replaced by the pressure-sensitive adhesive component (4) obtained in Production Example 4 mentioned above and the crosslinking agent was not used.

Referential Examples 7-c1 to 7-c3

The same procedure as in Example 7-1 was repeated to yield peelable pressure-sensitive adhesive compositions and peelable pressure-sensitive adhesive sheets, except that the pressure-sensitive adhesive component (1) was replaced by the referential adhesive components (c-1) to (c-3) obtained in Referential Production Examples 1 to 3, respectively. (In the case where the referential adhesive component (c-2) was used, no crosslinking agent was added.)

Comparative Examples 7c-1 to 7c-5

The same procedure as in Example 7-1 was repeated to yield peelable pressure-sensitive adhesive compositions and peelable pressure-sensitive adhesive sheets, except that the crosslinked spherical fine particles were replaced by comparative ones obtained respectively in Comparative Examples 1c-1 and 1c-3 to 1c-6 mentioned above.

Comparative Example 7c-6

The same procedure as in Example 7-1 was repeated to yield a peelable pressure-sensitive adhesive composition and a peelable pressure-sensitive adhesive sheet, except that the crosslinked spherical fine particles were not used.

Example 7-5

A peelable pressure-sensitive adhesive composition was prepared by uniformly mixing 133 parts of crosslinked spherical fine particles (30% dispersion in toluene) obtained in Example 1-2, 100 parts of the pressure-sensitive adhesive component (5) obtained in Production Example 5, 3 parts of isocyanate crosslinking agent ("Colonate L-55E" (55%) made by Nippon Polyurethane Kogyo Co., Ltd.), and 167 parts of toluene. The resulting peelable pressure-sensitive adhesive composition contains about 20% of nonvolatile matter, with the crosslinked spherical fine particles uniformly dispersed therein. The composition was made into a peelable pressure-sensitive adhesive sheet in the same manner as in Example 7-1.

Example 7-6

A peelable pressure-sensitive adhesive composition was prepared by uniformly mixing 30 parts of crosslinked spherical fine particles (30% dispersion in toluene) obtained in Example 1-2, 10 parts of the pressure-sensitive adhesive component (5) obtained in Production Example 5, 0.04 part of "Colonate L-55E" (explained above), and 25 parts of toluene. The resulting peelable pressure-sensitive adhesive composition contains about 20% of nonvolatile matter, with the crosslinked spherical fine particles uniformly dispersed therein. The composition was made into a peelable pressure-sensitive adhesive sheet in the same manner as Example 7-1.

Example 7-7

A peelable pressure-sensitive adhesive composition was prepared by uniformly mixing 14 parts of crosslinked spherical fine particles (30% dispersion in toluene) obtained in Example 1-2, 100 parts of the pressure-sensitive adhesive component (5) obtained in Production Example 5, 3 parts of "Colonate L-55E" (explained above), and 116 parts of toluene. The resulting peelable pressure-sensitive adhesive composition contains about 20% of nonvolatile matter, with the crosslinked spherical fine particles uniformly dispersed therein. The composition was made into a peelable pressure-sensitive adhesive sheet in the same manner as Example 7-1.

Example 7-8

A peelable pressure-sensitive adhesive composition was prepared by uniformly mixing 40 parts of crosslinked spherical fine particles (in powder form) obtained in Example 1-8, 100 parts of the pressure-sensitive component (5) obtained in Production Example 5, 3 parts of "Colonate L-55E" (explained above), and 265 parts of toluene. This composition contains about 20% of nonvolatile matter. This composition was made into a peelable pressure-sensitive adhesive article in the same manner as Example 7-1.

Examples 7-9 to 7-11

The same procedure as in Example 7-8 was repeated to give peelable pressure-sensitive adhesive compositions and peelable pressure-sensitive adhesive sheets, except that the crosslinked spherical fine particles were replaced by those which were obtained in Examples 1-21, 1-11, and 1-23, respectively.

Comparative Example 7c-7

The same procedure as in Example 7-5 was repeated to give a peelable pressure-sensitive adhesive composition and a peelable pressure-sensitive adhesive sheet, except that the crosslinked spherical fine particles were replaced by those which were obtained in Comparative Example 1c-2.

Comparative Example 7c-8

A peelable pressure-sensitive adhesive composition was prepared by mixing 100 parts of the pressure-sensitive adhesive component (5) obtained in Production Example 5 and 3 parts of "Colonate L-55E" (explained above) as a crosslinking agent, without adding the crosslinked spherical fine particles. The peelable pressure-sensitive adhesive composition was made into a peelable pressure-sensitive adhesive sheet in the same manner as in Example 7-1.

Example 7-12

A peelable pressure-sensitive adhesive composition containing 25% of nonvolatile matter was prepared by uniformly mixing 40 parts of crosslinked spherical fine particles in powder form obtained in Example 1-8, 100 parts of the pressure-sensitive adhesive component (6) obtained in Production Example 6, and 260 parts of deionized water. This peelable pressure-sensitive adhesive composition was made into a peelable pressure-sensitive adhesive sheet in the same manner as in Example 7-1.

Examples 7-13 to 7-15

The same procedure as in Example 7-12 was repeated to give peelable pressure-sensitive adhesive compositions and peelable pressure-sensitive adhesive sheets, except that the crosslinked spherical fine particles were replaced by those which were obtained in Examples 1-21, 1-11, and 1-23, respectively.

Example 7-16

A peelable pressure-sensitive adhesive composition containing 25% of nonvolatile matter was prepared by uniformly mixing 85.7 parts of crosslinked spherical fine particles (in the form of 30% aqueous dispersion) obtained in Example 1-9, 100 parts of the pressure-sensitive adhesive component (6) obtained in Production Example 6, and 157.1 parts of deionized water. This peelable pressure-sensitive adhesive composition was made into a peelable pressure-sensitive adhesive sheet in the same manner as in Example 7-1.

Example 7-17

The same procedure as in Example 7-16 was repeated to give a peelable pressure-sensitive adhesive composition and peelable pressure-sensitive adhesive sheet, except that the crosslinked spherical fine particles were replaced by those which were obtained in Example 1-24, respectively.

Comparative Example 7c-9

A peelable pressure-sensitive adhesive sheet was prepared in the same manner as in Example 7-1 from the pressure-sensitive adhesive component (6) obtained in Production Example 6, except that the crosslinked spherical fine particles were not used.

Example 7-18

The 30% dispersion in toluene of crosslinked spherical fine particles obtained in Example 1-13 was diluted to 5% with toluene. This dispersion was applied by blowing to the obverse (pressure-sensitive adhesive layer) of the adhesive sheet obtained in Comparative Example 7c-8, so that the dry coating layer contained 5 g/m$^2$ of crosslinked spherical fine particles. After drying at 90° C. for 2 minutes, it was obtained that a peelable pressure-sensitive adhesive sheet having a pressure-sensitive adhesive layer on the surface of which are crosslinked spherical fine particles are uniformly dispersed and fixed.

Example 7-19

The crosslinked spherical fine particles (in powder form) obtained in Example 1-14 were applied by blowing (in an amount of 5 g/m$^2$) to the surface of the pressure-sensitive adhesive layer (not yet dried) obtained in Comparative Example 7c-8. After drying and aging in the same manner as in Example 7-1, it was obtained that a peelable pressure-sensitive adhesive sheet having a pressure-sensitive adhesive layer on the surface of which are crosslinked spherical fine particles are uniformly dispersed and fixed.

Example 7-20

A peelable pressure-sensitive adhesive composition containing 20% of nonvolatile matter was prepared by uniformly mixing 300 parts of the crosslinked spherical fine particles (in the form of 30% dispersion in toluene) obtained in Example 1-1, 50 parts of masticated natural rubber, 40 parts of terpene resin, and 510 parts of toluene. This peelable pressure-sensitive adhesive composition was made into a peelable pressure-sensitive adhesive sheet in the same manner as in Example 7-1.

Example 7-21

The same procedure as in Example 7-20 was repeated to give a peelable pressure-sensitive adhesive composition and peelable pressure-sensitive adhesive sheet, except that the crosslinked spherical fine particles were replaced by the ones (30% dispersion in toluene) obtained in Example 1-13.

Table 5 collectively shows the compositions obtained in Examples 7-1 to 7-21, Referential Examples 7-c1 to 7-c3, and Comparative Examples 7c-1 to 7c-9.

TABLE 5

| | Crosslinked spherical fine particles | | Pressure-sensitive adhesive component | Crosslinking agent | |
|---|---|---|---|---|---|
| | Kind | Amount used (%)*1 | | Kind | Amount used (%)*2 |
| Example 7-1 | Example 1-13 | 60 | Production Example 1 | Colonate L-55E*3 | 4.125 |
| Example 7-2 | Example 1-13 | 60 | Production Example 2 | Butyl ether melamine | 3.0 |
| Example 7-3 | Example 1-13 | 60 | Production Example 3 | Colonate L-55E*3 | 4.125 |
| Example 7-4 | Example 1-13 | 60 | Production Example 4 | none | — |
| Referential Example 7-c1 | Example 1-13 | 60 | Referential Example 1 | Colonate L-55E*3 | 4.125 |
| Referential Example 7-c2 | Example 1-13 | 60 | Referential Example 2 | none | — |
| Referential Example 7-c3 | Example 1-13 | 60 | Referential Example 3 | Colonate L-55E*3 | 4.125 |
| Comparative Example 7c-1 | Comparative Example 1c-1 | 60 | Production Example 1 | Colonate L-55E*3 | 4.125 |
| Comparative Example 7c-2 | Comparative Example 1c-3 | 60 | Production Example 1 | Colonate L-55E*3 | 4.125 |
| Comparative Example 7c-3 | Comparative Example 1c-4 | 60 | Production Example 1 | Colonate L-55E*3 | 4.125 |
| Comparative Example 7c-4 | Comparative Example 1c-5 | 60 | Production Example 1 | Colonate L-55E*3 | 4.125 |
| Comparative Example 7c-5 | Comparative Example 1c-6 | 60 | Production Example 1 | Colonate L-55E*3 | 4.125 |
| Comparative Example 7c-6 | none | — | Production Example 1 | Colonate L-55E*3 | 4.125 |
| Example 7-5 | Example 1-2 | 50 | Production Example 5 | Colonate L-55E*3 | 4.125 |
| Example 7-6 | Example 1-2 | 69.2 | Production Example 5 | Colonate L-55E*3 | 0.55 |
| Example 7-7 | Example 1-2 | 9.5 | Production Example 5 | Colonate L-55E*3 | 4.125 |
| Example 7-8 | Example 1-8 | 50 | Production Example 5 | Colonate L-55E*3 | 4.125 |
| Example 7-9 | Example 1-21 | 50 | Production Example 5 | Colonate L-55E*3 | 4.125 |
| Example 7-10 | Example 1-11 | 50 | Production Example 5 | Colonate L-55E*3 | 4.125 |
| Example 7-11 | Example 1-23 | 50 | Production Example 5 | Colonate L-55E*3 | 4.125 |
| Comparative Example 7c-7 | Comparative Example 1c-2 | 50 | Production Example 5 | Colonate L-55E*3 | 4.125 |
| Comparative Example 7c-8 | none | — | Production Example 5 | Colonate L-55E*3 | 4.125 |
| Example 7-12 | Example 1-8 | 40 | Production Example 6 | Dehydrated benzoguanamine | 1.0 |
| Example 7-13 | Example 1-21 | 40 | Production Example 6 | Dehydrated benzoguanamine | 1.0 |
| Example 7-14 | Example 1-11 | 40 | Production Example 6 | Dehydrated benzoguanamine | 1.0 |
| Example 7-15 | Example 1-23 | 40 | Production Example 6 | Dehydrated benzoguanamine | 1.0 |
| Example 7-16 | Example 1-9 | 30 | Production Example 6 | Dehydrated benzoguanamine | 1.0 |
| Example 7-17 | Example 1-24 | 30 | Production Example 6 | Dehydrated benzoguanamine | 1.0 |
| Comparative Example 7c-9 | none | — | Production Example 6 | Dehydrated benzoguanamine | 1.0 |
| Example 7-18 | Example 1-13 | 5 g/m$^2$ | Production Example 1 | Colonate L-55E*3 | 4.125 |
| Example 7-19 | Example 1-23 | 5 g/m$^2$ | Production Example 1 | Colonate L-55E*3 | 4.125 |
| Example 7-20 | Example 1-1 | 50 | Natural rubber + terpene resin | — | |
| Example 7-21 | Example 1-13 | 50 | Natural rubber + terpene resin | — | |

Note to Table 5.
*1 wt % of crosslinked spherical fine particles based on the total amount of solids in crosslinked spherical fine particles and solids in pressure sensitive adhesive.
*2 wt % of crosslinking agent based on nonvolatile matter in pressure sensitive adhesive.
*3 isocyanate crosslinking agent (55%), made by Nippon Polyurethane Kogyo Co., Ltd.

The peelable pressure-sensitive adhesive sheets obtained in Examples 7-1 to 7-21, Referential Examples 7-c1 to 7-c3, and Comparative Examples 7c-1 to 7c-9 were tested for performance according to the following methods. The results are shown Table 6.

Performance Test

Each specimen was stuck to a piece of woodfree paper as an adherend, and was examined for initial adhesion, initial peelability, repeated adhesion, and peelability after a lapse of long time.

Initial adhesion

A specimen of peelable pressure-sensitive adhesive sheet, cut to 2 cm by 2 cm, is lightly pressed against a piece of vertically held woodfree paper at 10° C., 23° C., and 35° C., and the initial adhesion of the specimen is rated according to the following criteria.
A: Specimen remains on the paper.
B: Specimen drops after 60 minutes.
C: Specimen drops after 1 minute but before 60 minutes.
D: Specimen drops within 1 minute.

Initial peelability
A: No change found on paper.
B: Residue or trace of adhesive barely left on paper.
C: Residue or trace of adhesive slightly left on paper.
D: Paper surface slightly damaged.
E: Paper surface peeled off.

Repeated adhesion

A specimen of peelable pressure-sensitive adhesive sheet is pressed against a piece of woodfree paper and peeled 1 minute later repeatedly 50 times at 10° C., 23° C., and 35° C. The number of cycles required for a specimen to fall within one minute from the vertically held woodfree paper was recorded.

Peerability after a lapse of long time

A specimen of peelable pressure-sensitive adhesive sheet is pressed against a piece of woodfree paper in the same manner as mentioned above. After standing at 10° C., 23° C. and 35° C. for 1 month, the specimen is peeled and the surface of the adherend is examined in the same manner as in the initial peelability test.

TABLE 6

| | Initial adhesion | | | Initial peelability | | | Repeated adhesion | | | Peelability after lapse of time | | |
|---|---|---|---|---|---|---|---|---|---|---|---|---|
| | 10° C. | 23° C. | 35° C. | 10° C. | 23° C. | 35° C. | 10° C. | 23° C. | 35° C. | 10° C. | 23° C. | 35° C. |
| Example 7-1 | A | A | A | A | A | A | 50< | 50< | 50< | A | A | A |
| Example 7-2 | A | A | A | A | A | A | 50< | 50< | 50< | A | A | A |
| Example 7-3 | A | A | A | A | A | A | 50< | 50< | 50< | A | A | A |
| Example 7-4 | B | A | A | A | A | A | 50< | 50< | 45 | A | B | B |
| Referential Example 7-c1 | C | B | A | A | A | A | 50< | 50< | 50< | A | B | C |
| Referential Example 7-c2 | A | A | A | B | C | C | 35 | 30 | 23 | C | D | D |
| Referential Example 7-c3 | C | B | A | A | A | A | 47 | 50< | 50< | A | A | A |
| Comparative Example 7c-1 | A | A | A | B | C | D | 30 | 10 | 3 | D | E | E |
| Comparative Example 7c-2 | A | A | A | A | A | B | 50< | 40 | 20 | C | D | E |
| Comparative Example 7c-3 | A | A | A | A | B | C | 50< | 24 | 5 | D | E | E |
| Comparative Example 7c-4 | A | A | A | A | A | B | 50< | 46 | 22 | C | D | E |
| Comparative Example 7c-5 | A | A | A | A | A | B | 50< | 48 | 21 | C | D | E |
| Comparative Example 7c-6 | A | A | A | D | E | E | 1 | 0 | 0 | E | E | E |
| Example 7-5 | A | A | A | A | A | B | 50< | 50< | 50< | A | A | B |
| Example 7-6 | B | A | A | A | A | A | 50< | 50< | 50< | A | A | A |
| Example 7-7 | A | A | A | A | B | B | 50< | 50< | 50< | A | B | B |
| Example 7-8 | A | A | A | A | A | B | 50< | 50< | 50< | A | A | B |
| Example 7-9 | A | A | A | A | A | A | 50< | 50< | 50< | A | A | A |
| Example 7-10 | A | A | A | A | B | B | 50< | 50< | 50< | A | B | B |
| Example 7-11 | A | A | A | A | A | A | 50< | 50< | 50< | A | A | A |
| Comparative Example 7c-7 | D | C | B | — | B | B | — | 50< | 50< | — | C | D |
| Comparative Example 7c-8 | A | A | A | D | E | E | 1 | 0 | 0 | E | E | E |
| Example 7-12 | A | A | A | A | A | B | 50< | 50< | 50< | A | A | B |
| Example 7-13 | A | A | A | A | A | A | 50< | 50< | 50< | A | A | A |
| Example 7-14 | A | A | A | A | B | B | 50< | 50< | 50< | A | B | B |
| Example 7-15 | A | A | A | A | A | A | 50< | 50< | 50< | A | A | A |
| Example 7-16 | B | B | A | A | A | A | 50< | 50< | 50< | A | A | A |
| Example 7-17 | B | A | A | A | A | A | 50< | 50< | 50< | A | A | A |
| Comparative Example 7c-9 | A | A | A | D | E | E | 1 | 0 | 0 | E | E | E |
| Example 7-18 | A | A | A | A | A | A | 50< | 50< | 50< | A | A | A |
| Example 7-19 | A | A | A | A | A | A | 50< | 50< | 50< | A | A | A |
| Example 7-20 | A | A | A | A | A | A | 50< | 50< | 50< | A | B | B |
| Example 7-21 | A | A | A | A | A | A | 50< | 50< | 50< | A | A | B |

Effect of the Invention

The present invention constituted as mentioned above provides crosslinked spherical fine particles having good physical properties (toughness and resilience) and chemical properties. They are obtained by the polymerization of the polymerizable component [M] which contains the polymerizable vinyl group-containing compound (V) prepared by the reaction of the specific polyol (a), isocyanate compound (b), and active hydrogen-containing polymerizable vinyl monomer (c). Owing to their characteristic properties, the crosslinked spherical fine particles can be made into a coating composition by incorporation with a binder. This coating composition can be formed into a film or applied to a sheet substrate. The resulting film and coating have a good appearance and feel. Moreover, the crosslinked spherical fine particles can be incorporated into a peelable pressure sensitive adhesive to improve the peelability owing to their good elastic properties. Therefore, the crosslinked spherical fine particles are useful as an ingredient for peelable pressure sensitive adhesives and peelable pressure sensitive adhesive articles.

We claim:

1. A coating composition which comprises (1) crosslinked spherical fine particles which are formed by radical polymerization of a component (M) capable of radical polymerization containing as an essential component a vinyl group-containing compound (V) capable of radical polymerization which is obtained by the reaction of:

one or more than one kind of polyol (a) containing polyester polyol and/or polyether polyol, one or more than one kind of compound (b) containing two or more isocyanate groups in the molecule, and one or more than one kind of active hydrogen-containing vinyl monomer (c) capable of radical polymerization, and (2) a binder resin.

2. A coating composition as claimed in claim 1, wherein component (M) contains the vinyl group-containing compound (V) in an amount of 20 to 100 wt % of component (M).

3. A coating composition as claimed in claim 1, wherein the vinyl group-containing compound (V) is one which is obtained by the reaction of:

15 to 93 wt % of one or more than one kind of polyol (a) containing polyester polyol and/or polyether polyol, 5 to 83 wt % of one or more than one kind of compound (b) containing two or more isocyanate groups in the molecule, and 2 to 80 wt % of one or more than one kind of active hydrogen-containing vinyl monomer (c) capable of radical polymerization, with the total amount of (a)+(b)+(c) being 100 wt % of compound (V).

4. A coating composition as claimed in claim 1, wherein the compound (b) is one which has 2 to 4 isocyanate groups in the molecule.

5. A coating composition as claimed in claim 1, wherein the vinyl monomer (c) is a (meth)acrylic ester having a hydroxyl group(s).

6. A coating composition as claimed in claim 1, wherein component (M) contains another component (Mo) capable of radical polymerization.

7. A coating composition as claimed in claim 6, wherein component (Mo) contains at least one (meth)acrylic ester in an amount of more than 50 wt % of component (Mo).

8. A coating composition as claimed in claim 7, wherein the at least one (meth)acrylic ester is one which has an active hydrogen(s).

9. A coating composition as claimed in claim 1, wherein the composition is colored.

10. A coating composition as claimed in claim 1, wherein the particles have an average particle diameter of 1 to 100 μm.

11. A coating composition as claimed in claim 10, wherein the particles have an average particle diameter of 3 to 70 μm.

12. A coating composition as claimed in claim 11, wherein the particles have an average particle diameter of 5 to 50 μm.

13. A coating composition as claimed in claim 1, produced by a process which comprises subjecting to radical polymerization component (M) in a solvent (S) which does not substantially dissolve said component (M).

14. A composition as claimed in claim 13, wherein component (M) undergoes radical polymerization in solvent (S) in the presence of a dispersing agent (D).

15. A composition as claimed in claim 14, wherein a part of the solvent (S) is dispersed into component (M) in the presence of dispersing agent (D), thereby temporarily establishing a reversed phase dispersion state in which component (M) constitutes the continuous phase, adding the remaining solvent (S) and, if necessary, dispersing agent (D), thereby inverting the phase into the normal dispersion state in which the solvent (S) constitutes the continuous phase, and performing radical polymerization.

16. A composition as claimed in claim 15, wherein component (M) and solvent (S) are present in the ratio of 40/60 to 95/5 by weight in the reversed phase dispersion state.

17. A composition as claimed in claim 15 wherein the solvent (S) is water.

18. A composition as claimed in claim 17, wherein the dispersing agent (D) is a water-soluble compound (Dw).

19. A composition as claimed in claim 18, wherein the water-soluble compound (Dw) is a water-soluble polymer.

20. A composition as claimed in claim 18, wherein the water-soluble compound (Dw) is a water-soluble surface active agent.

21. A composition as claimed in claim 15, wherein the solvent (S) is an aliphatic hydrocarbon solvent.

22. A composition as claimed in claim 21, wherein the aliphatic hydrocarbon solvent is one or more than one kind selected from the group consisting of n-hexane, cyclohexane, n-heptane, and mineral spirit.

23. A composition as claimed in claims 21 or 22, wherein the dispersing agent (D) is a polymeric compound soluble in an aliphatic hydrocarbon solvent.

24. A composition as claimed in claim 23, wherein the dispersing agent (D) is an alkyd resin and/or urethane-modified alkyd resin.

25. A coating composition as claimed in claim 1, which contains a pigment as an additional component.

26. A coating composition as claimed in claim 1 which comprises two or more kinds of crosslinked spherical fine particles, one being colorless transparent and/or others being colored.

27. A coating composition as claimed in claim 25 which comprises two or more kinds of crosslinked spherical fine particles, one being colorless transparent and others being colored.

28. A coating composition as claimed in any of claims 1, 25, 26, 27 wherein the crosslinked spherical fine particles account for 3 to 80 wt % of total solids.

29. A coating composition as claimed in any of claims 1, 25, 26, 27, 28, wherein the binder resin is one or more than one kind selected from the group consisting of acrylic resin, vinyl resin, alkyd resin, polyester resin, epoxy resin, urethane resin, olefin resin, fluorocarbon resin, polyamide resin, siloxane resin, silicone-modified polyester resin, and silicone-modified acrylic resin.

30. A filmlike article which is formed from the coating compositions claimed in any of claims 1, 25, 26, 27, 28.

\* \* \* \* \*